United States Patent
Saita

[11] Patent Number: 5,936,708
[45] Date of Patent: Aug. 10, 1999

[54] LIGHT-PATTERN ILLUMINATING APPARATUS AND LIGHT-PATTERN ILLUMINATING METHOD

[75] Inventor: Hirofumi Saita, Kanagawa, Japan

[73] Assignee: Fuji Photo Film Co., Ltd., Kanagawa, Japan

[21] Appl. No.: 08/872,728

[22] Filed: Jun. 11, 1997

[30] Foreign Application Priority Data

Jun. 11, 1996 [JP] Japan ..................................... 8-149278

[51] Int. Cl.⁶ .......................... G03B 27/52; G03B 27/80; G02F 1/13
[52] U.S. Cl. .............................. 355/20; 355/38; 347/226; 347/230
[58] Field of Search .................................. 355/20, 35, 38; 347/226, 229, 230, 231; 358/302, 501, 507, 471; 348/761, 766; 349/1, 2, 3

[56] References Cited

U.S. PATENT DOCUMENTS 5,235,437 8/1993 Katagiri et al. ........................ 358/471
5,805,274 9/1998 Saita ......................................... 355/38

FOREIGN PATENT DOCUMENTS 7-199214 8/1995 Japan .............................. G02F 1/135
7-270746 10/1995 Japan ................................ G02F 1/13
8-240867 9/1996 Japan .............................. G03B 27/72

Primary Examiner—Alan A. Mathews
Attorney, Agent, or Firm—Sughrue, Mion, Zinn, Macpeak & Seas, PLLC

[57] ABSTRACT

A light-pattern illuminating apparatus comprises: a light-pattern holding device in which, when a light pattern is applied to one surface thereof, the light pattern is written, and from which, when reading light is applied to another surface thereof, the written light pattern is read; a light-pattern writing device for applying the light pattern corresponding to image information to the one surface of the light-pattern holding device in a state in which at least vertical scanning is controlled; a light-pattern reading and illuminating device for illuminating another surface of the light-pattern holding device with the reading light and for illuminating an image receiving element with the light pattern which has been read from the light-pattern holding device; and a controlling device for controlling the duration of illumination of the image receiving element with the light pattern so that the duration becomes approximately an integral multiple of the period of vertical scanning.

14 Claims, 17 Drawing Sheets

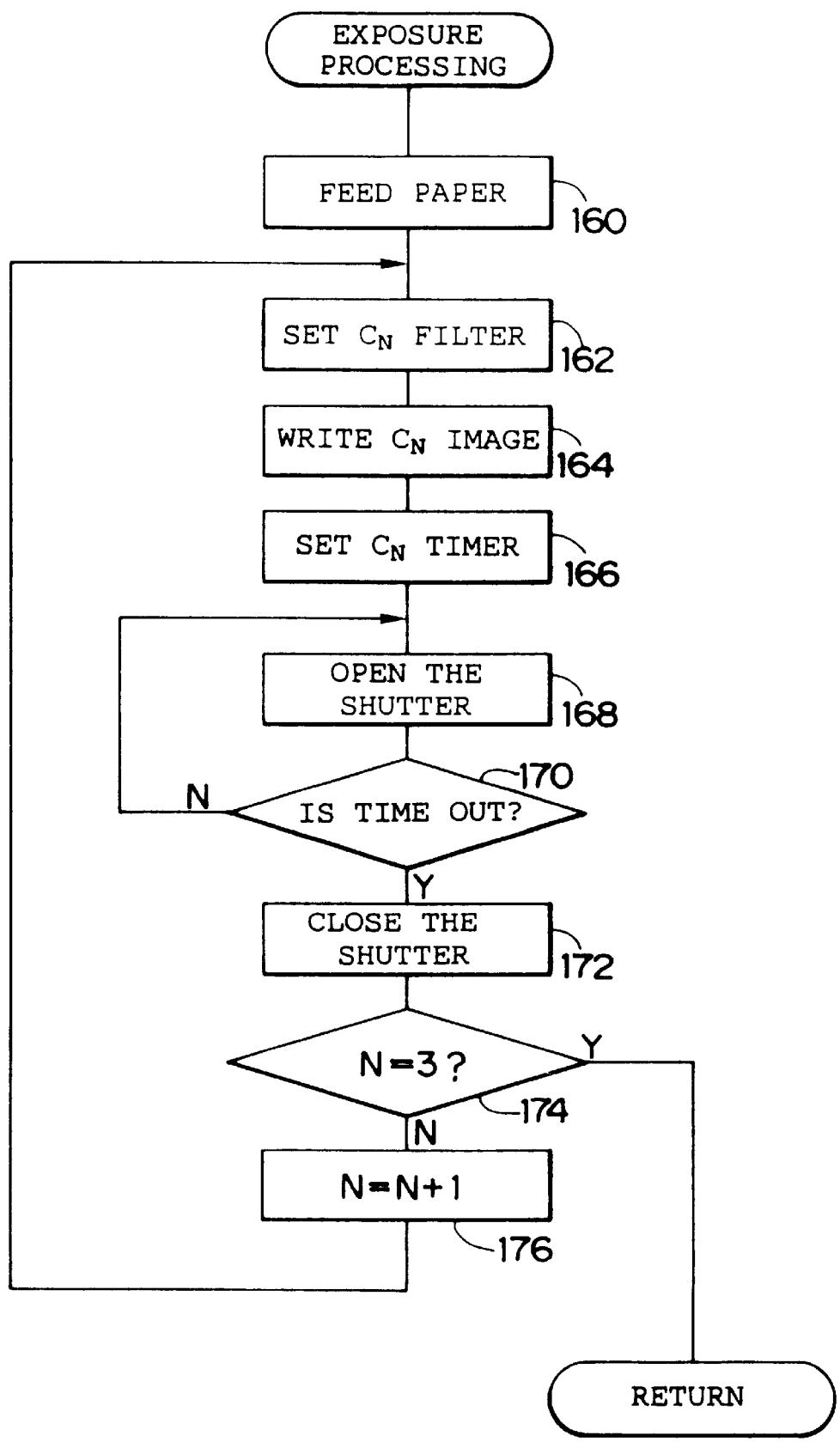

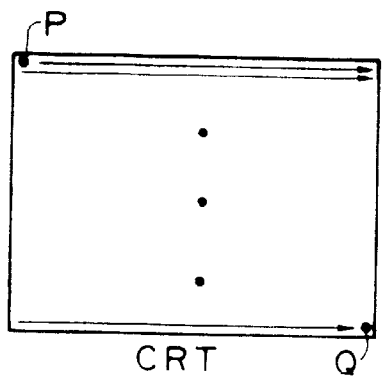
FIG.17A
CRT
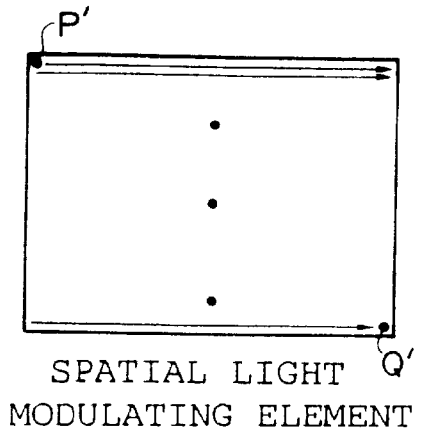
FIG.17B
SPATIAL LIGHT MODULATING ELEMENT

FIG.17E
FIG.17F
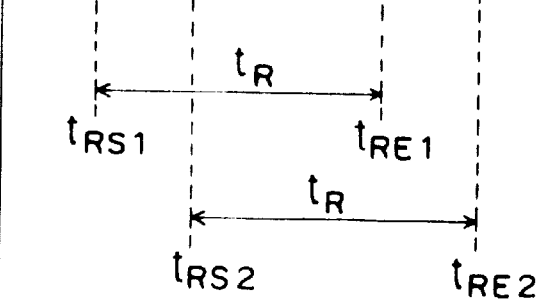

LIGHT-PATTERN ILLUMINATING APPARATUS AND LIGHT-PATTERN ILLUMINATING METHOD

BACKGROUND OF THE INVENTION

1. Field of the Invention

The present invention relates to a light-pattern illuminating apparatus and a light-pattern illuminating method which are used in an image recording apparatus in which a light pattern corresponding to image information is applied to an image receiving element and an image represented by image information is recorded on the image receiving element, or in an image reading apparatus in which an image represented by image information is read by the image receiving element.

2. Description of the Related Art

In recent years, research and development have been advancing concerning a technology in which, in an image recording apparatus such as a photographic printer and an image reading apparatus such as a scanner, surface exposure is effected by using a light-conductive type liquid-crystal light bulb used in the field of color television projectors, for example.

As shown in FIG. 16, Japanese Patent Application Laid-Open (JP-A) No. 7-270746 discloses a technique relating to an image recording apparatus which is capable of recording an image with high resolution at high speed by using a general-purpose photosensitive material.

In this image recording apparatus, a pattern of light 230 corresponding to an image of blue (B) represented by image signal Q is projected from a CRT 221 and is applied and written to a spatial light modulating element 223. Then, reading light 240 is made emergent from a halogen lamp 227, and this reading light 240 is transmitted through a B filter 228, is made incident upon a prism beam splitter 224, is reflected by the prism beam splitter 224, and is made incident upon the spatial light modulating element 223.

The reading light 240 is modulated and reflected by the spatial light modulating element 223 in correspondence with the written light pattern, is again transmitted through the spatial beam splitter 224 as recording light 250, and is applied to a photosensitive material 226 through a projection lens 225. Then, the photosensitive material 226 is sensitized by the recording light 250, thereby recording an image of B. Thereafter, light patterns of green (G) and red (R) are consecutively recorded on the photosensitive material 226 in a similar manner.

According to this image recording apparatus, a light pattern corresponding to an image to be recorded is temporarily written to the spatial light modulating element 223, reading light is applied to the spatial light modulating element 223 to read the light pattern written to the spatial light modulating element 223, and the light pattern thus read is recorded on the photosensitive material. Therefore, a high-resolution light pattern can be written to the spatial light modulating element 223 without making the luminance high for the CRT 221 used for writing a light pattern. At the same time, if the amount of reading light for reading the light pattern is increased, a high-resolution image can be recorded on the photosensitive material in a short time. Furthermore, after the image to be recorded is temporarily written to the spatial light modulating element 223 as a light pattern, the light pattern is read by the reading light, and is recorded on the photosensitive material. Therefore, the problem of so-called reciprocity law failure does not occur.

Thus, technology is conventionally known in which a light pattern corresponding to an image to be recorded is written to the spatial light modulating element by making use of a surface illuminant such as a CRT, reading light from the prism beam splitter is reflected (modulated) in correspondence to the written light pattern, and individual images of R, G, and B are recorded on the photosensitive material, thereby obtaining a color image.

As a technique relating to the present invention, a technique is described in Japanese Patent Application Laid-Open (JP-A) No. 8-240867.

However, with the technique described in Japanese Patent Application Laid-Open (JP-A) No. 7-270746, an image to be recorded is written to a light modulating layer of the spatial light modulating element, which consists of a liquid crystal or the like which is not provided with the features of a memory, by means of a surface illuminant as a light pattern. The written light pattern is read for a predetermined duration irrespective of the write scanning period by means of the reading light of the three colors, R, G, and B, respectively, and the photosensitive material is exposed by the light patterns thus read. Therefore, there have been problems in that deviations in color tone and density unevenness occur periodically in reproduced images obtained, and that places where deviations in color tone and density unevenness occur are not fixed, so the finished quality of a plurality of reproduced images obtained from identical image signal Q is not the same.

Hereafter, referring to FIGS. 17A to 17F, a detailed description will be given of the causes of the occurrence of deviations in color tone and density unevenness in the technique described in Japanese Patent Application Laid-Open (JP-A) No. 7-270746.

FIG. 17A is a diagram in which scanning lines of the CRT 221 are viewed from the spatial light modulating element 223 side. To simplify the description, it is assumed that the CRT 221 is an interlaced type, and that positions of the first and last pixels which form scanning lines are respectively located at points P and Q. FIG. 17B is a diagram in which scanning lines of an image written to the spatial light modulating element 223 are viewed from the photosensitive material 226 side. If points on the spatial light modulating element 223 corresponding to points P and Q on the CRT 221 are assumed to be P' and Q', respectively, and if the reflectance at point P', as viewed from the photosensitive material 226 side, is measured by a measuring instrument, the reflectance fluctuates as shown in FIG. 17D. Incidentally, FIG. 17C shows the period (period of vertical scanning) in which a beam of the CRT 221 scans from point P' to point Q'. In addition, point P' shown in FIG. 17C corresponds (assumes the same timing) to rise starting point P' in the fluctuation of the reflectance shown in FIG. 17D.

In contrast, in the technique described in Japanese Patent Application Laid-Open (JP-A) No. 7-270746, in a case where a plurality of identical reproduced images are recorded on the photosensitive material 226, the exposure of R for recording, for instance, a first reproduced image starts at timing $t_{RS1}$ and ends at timing $t_{RE1}$ (see FIG. 17E), and the exposure of R for recording a second reproduced image starts at timing $t_{RS2}$ and ends at timing t (see FIG. 17F). Thus, although exposure time $t_R$ for R is fixed, timings at which the exposure of R starts and ends are not fixed with respect to fluctuations of reflectance shown in FIG. 17D. The same also applies to G and B.

Accordingly, since, as viewed from the photosensitive material 226 side, an integrated value (or average value) of reflectance is not fixed during the period of exposure of the photosensitive material 226, deviations in color tone and density unevenness. For this reason, the finished quality of the plurality of reproduced images recorded on the photosensitive material is not identical.

SUMMARY OF THE INVENTION

In view of the above-described circumstances, it is an object of the present invention to provide a light-pattern illuminating apparatus and a light-pattern illuminating method which are capable of preventing the occurrence of deviations in color tone and density unevenness in an image receiving element.

To this end, in accordance with a first aspect of the present invention, there is provided a light-pattern illuminating apparatus for use in an image recording apparatus in which a light pattern corresponding to image information is applied to an image receiving element and an image represented by image information is recorded on the image receiving element, or in an image reading apparatus in which an image represented by image information is read by the image receiving element, comprising: light-pattern holding means in which, as the light pattern is applied to one surface thereof, the light pattern is written, and from which, as reading light is applied to another surface thereof, the written light pattern is read; light-pattern writing means for applying the light pattern corresponding to image information to the one surface of the light-pattern holding means in a state in which at least vertical scanning is controlled; light-pattern reading and illuminating means for illuminating another surface of the light-pattern holding means with the reading light and for illuminating the image receiving element with the light pattern which has been read from the light-pattern holding means; and controlling means for controlling a duration of illumination of the image receiving element with the light pattern such that the duration becomes approximately an integral multiple of a period of the vertical scanning.

In the above-described first aspect of the invention, the light pattern which has been written to the light-pattern holding means is read by the reading light, and is applied to the image receiving element. Here, as the light-pattern holding means, it is possible to cite, for example, a spatial light modulating element. As the image receiving element, it is possible to cite, for example, a photosensitive material on which an image represented by a light pattern is recorded, or a sensor for reading an image represented by a light pattern. The controlling means provides control such that the duration of illumination of the image receiving element with the light pattern becomes approximately an integral multiple of the period of vertical scanning in the illumination of the light-pattern holding means with the light pattern by the light-pattern writing means.

If the duration of illumination of the image receiving element with the light pattern is made approximately an integral multiple of the period of vertical scanning, an integrated value of the amount of illuminating light at each portion of image receiving when the light pattern is applied a plurality of times to the image receiving element on the basis of identical image information becomes equal for each illumination. In addition, in a case which the application of the light pattern is started within the blanking period of vertical scanning and is finished within the blanking period of vertical scanning, even if the duration of illumination with the light pattern does not accurately coincide with an integral multiple of the vertical scanning period (it is a value approximate to an integral multiple of the vertical scanning period), an integrated value of the amount of illuminating light at each portion of the image receiving when the light pattern is applied a plurality of times to the image receiving element on the basis of identical image information becomes equal for each illumination.

Therefore, in accordance with the first aspect of the invention, it is possible to prevent the occurrence of deviations in color tone and density unevenness in the image receiving element. Further, if the light-pattern illuminating apparatus in accordance with the present invention is used in an image recording apparatus for recording an image on an image receiving element, the finished quality of a plurality of images which is recorded on the image receiving element can be made substantially fixed.

In accordance with a second aspect of the present invention, in the first aspect of the invention, the controlling means provides control such that the start of application of the light pattern to the image receiving element is synchronized with the start of vertical scanning, and the end of application of the light pattern thereto is synchronized with the end of an integral number of times of vertical scanning.

In the above-described second aspect of the invention, control is provided such that the start of application of the light pattern to the image receiving element is synchronized with the start of vertical scanning in the illumination of the light-pattern holding means with the light pattern by the light-pattern writing means, and that the end of application of the light pattern is synchronized with the end of an integral number of times of the vertical scanning. As a result, as described in the first aspect of the invention, the duration of illumination of the image receiving element with the light pattern becomes approximately an integral multiple of the period of vertical scanning. Accordingly, compared to a case in which the period of vertical scanning is measured and control is provided such that the duration of illumination with the light pattern becomes an integral multiple of the measured period, the prevention of occurrence of deviations in color tone and density unevenness in the image receiving element can be realized by simple control.

In the first and second aspects of the invention, since control is provided such that the duration of illumination of the image receiving element with the light pattern becomes approximately an integral multiple of the period of vertical scanning in the illumination of the light-pattern holding means with the light pattern by the light-pattern writing means, there is the possibility that a time lag can occur in the actual duration of illumination of the image receiving element with the light pattern relative to a theoretically optimum duration of illumination of the image receiving element with the light pattern, which is determined from image information. Hence, it does not necessarily follow that the amount of exposure of the image receiving element with the light pattern (an integrated value of the amount of application of the light pattern) becomes an optimum value. For this reason, if the light-pattern illuminating apparatus in accordance with the present invention is used in, for example, an image recording apparatus for recording an image on an image receiving element, it is conceivable that images which are recorded on the image receiving element are not recorded with an optimum finish.

For this reason, in accordance with a third aspect of the present invention, in the first or second aspect of the invention, the controlling means determines a theoretical value of the duration of illumination of the image receiving element with the light pattern on the basis of image information, and sets a set value of the duration of illumination of the image receiving element with the light pattern such that the set value becomes a value which is equal to or greater than the determined theoretical value and agrees with or is approximate to a minimum value of integral multiples of the period of vertical scanning, and wherein the light-pattern writing means corrects image information on the basis of the difference between the theoretical value and the set value of the duration of illumination of the image receiving element with the light pattern, and applies the light pattern corresponding to corrected image information to the one surface of the light-pattern holding means, or the light-pattern reading and illuminating means correct the amount of application of reading light to another surface of the light-pattern holding means on the basis of the difference between the theoretical value and the set value of the duration of illumination of the image receiving element with the light pattern.

In the above-described third aspect of the invention, the controlling means determines the theoretical value of the duration of illumination with the light pattern, and sets a set value of the duration of illumination such that the set value becomes a value which is equal to or greater than the determined theoretical value and agrees with or is approximate to a minimum value of integral multiples of the period of vertical scanning (however, a case in which the set value of the duration of illumination can be the approximate value is where the start and end of application of the light pattern are effected within the blanking period of vertical scanning). Further, in a case where the light-pattern writing means corrects image information on the basis of the difference between the theoretical value and the set value of the duration of illumination with the light pattern, and applies the light pattern corresponding to corrected image information to the light-pattern holding means, the light pattern corresponding to corrected image information is written to the light-pattern holding means, and with respect to the light pattern which is applied to the image receiving element after being read from the light-pattern holding means by application of reading light to another surface of the light-pattern holding means, the amount of application of light to the image receiving element is corrected in correspondence to the difference between the theoretical value and the set value of the duration of illumination with the light pattern.

In addition, also in a case where the light-pattern reading and illuminating means corrects the amount of application of the reading light to another surface of the light-pattern holding means on the basis of the difference between the theoretical value and the set value of the duration of illumination of the image receiving element with the light pattern, the amount of illumination of the image receiving element with the light pattern which is read from the light-pattern holding means by application of the reading light to another surface of the light-pattern holding means is corrected in correspondence to the difference between the theoretical value and the set value of the duration of illumination with the light pattern. Therefore, in accordance with the third aspect of the invention, it is possible to apply the light pattern to the image receiving element with an optimum exposure amount.

In addition, in the third aspect of the invention, since the set value of the duration of illumination with the light pattern is set so that the set value becomes a value which agrees with or is approximate to a minimum value of integral multiples of the period of vertical scanning, the illumination of the image receiving element with the light pattern is completed in a short period of time. Hence, if the light-pattern illuminating apparatus in accordance with the present invention is used in an image recording apparatus for recording an image on an image receiving element, the recording of images on the image receiving element can be effected in a short period of time.

In accordance with a fourth aspect of the present invention, the light-pattern illuminating apparatus according to any one of the first to third aspects of the invention further comprises: photometrical measuring means for photometrically measuring the light pattern which has been read from the light-pattern holding means as a two-dimensional distribution of light intensity; and correcting means for correcting image information on the basis of a difference between the two-dimensional distribution of light intensity photometrically measured by the photometrical measuring means and image information, wherein the light-pattern writing means applies the light pattern corresponding to image information corrected by the correcting means to the one surface of the light-pattern holding means.

In the above-described fourth aspect of the invention, the light pattern which has been read from the light-pattern holding means is photometrically measured by the photometrical measuring means as a two-dimensional distribution of light intensity. Incidentally, the photometric measurement of the light pattern by the photometrical measuring means can be specifically realized if a branching means is provided for branching the light pattern which has been read from the light-pattern holding means, and if the light pattern branched by the branching means is photometrically measured. As the branching means, any branching means may be used insofar as it is capable of branching the optical path of the light pattern into two directions as with a beam splitter or the like.

In addition, in the fourth aspect of the invention, image information is corrected by the correcting means on the basis of the difference between the two-dimensional distribution of light intensity photometrically measured by the photometrical measuring means and image information. As a result, image information is corrected so that the light pattern which is read from the light-pattern holding means substantially agrees with image information, and the light pattern corresponding to the corrected image information is written to the light-pattern holding means. Hence, even in a case where unevenness due to the light-pattern holding means occurs in the light pattern which is read from the light-pattern holding means, the light pattern which is read from the light-pattern holding means and is applied to the image receiving element substantially agrees with image information existing prior to correction. Accordingly, it is possible to eliminate unevenness in the light pattern which is applied to the image receiving element.

Further, in the fourth aspect of the invention, if the correcting means corrects a gradation of image information for each pixel, gradations of the light pattern which is written to the light-pattern holding means can be corrected in units of very small regions, so that a light pattern which is less free of unevenness can be applied to the image receiving element.

In accordance with a fifth aspect of the present invention, there is provided a light-pattern illuminating method for use in an image recording apparatus in which a light pattern corresponding to image information is applied to an image receiving element and an image represented by image information is recorded on the image receiving element, or in an image reading apparatus in which an image represented by image information is read by the image receiving element, comprising the steps of: writing the light pattern in light-pattern holding means by applying the light pattern corresponding to image information to one surface of the light-pattern holding means while at least vertical scanning is being controlled; reading the light pattern written to the light-pattern holding means by applying reading light to another surface of the light-pattern holding means; and illuminating the image receiving element with the light pattern which has been read from the light-pattern holding means, for a duration which is approximately an integral multiple of a period of the vertical scanning.

In the above-described fifth aspect of the present invention, since the light pattern which has been read from the light-pattern holding means is applied to the image receiving element for a duration which is approximately an integral multiple of the period of vertical scanning, it is possible to prevent the occurrence of deviations in color tone and density unevenness in the image receiving element in the same way as in the first aspect of the invention. Further, if the light-pattern illuminating apparatus in accordance with the present invention is used in an image recording apparatus for recording an image on an image receiving element, the finished quality of a plurality of images which are recorded on the image receiving element can be made substantially fixed.

In accordance with a sixth aspect of the present invention, in the fifth aspect of the invention, the illumination of the image receiving element with the light pattern which has been read from the light-pattern holding means is started in synchronization with the start of vertical scanning, and is finished in synchronization with the end of an integral number of times of vertical scanning.

In the above-described sixth aspect of the invention, since the illumination of the image receiving element with the light pattern is started in synchronization with the start of vertical scanning in the illumination of the light-pattern holding means with the light pattern corresponding to image information, and is finished in synchronization with the end of an integral number of times of vertical scanning, the prevention of occurrence of deviations in color tone and density unevenness in the image receiving element can be realized by simple control.

In accordance with a seventh aspect of the present invention, in the fifth or sixth aspect of the invention, the light pattern which has been read from the light-pattern holding means is photometrically measured as a two-dimensional distribution of light intensity, image information is corrected on the basis of a difference between the photometrically measured two-dimensional distribution of light intensity and image information, and the light pattern corresponding to corrected image information is applied to the one surface of the light-pattern holding means.

In the above-described seventh aspect of the invention, the light pattern which has been read from the light-pattern holding means is photometrically measured as a two-dimensional distribution of light intensity, and image information is corrected on the basis of the difference between the photometrically measured two-dimensional distribution of light intensity and image information. Accordingly, it is possible to eliminate unevenness in the light pattern which is applied to the image receiving element in the same way as in the fourth aspect of the invention.

The above and other objects, features, and advantages of the present invention will become more apparent from the following detailed description of the invention when read in conjunction with the accompanying drawings.

BRIEF DESCRIPTION OF THE DRAWINGS

FIG. 7 is a flowchart illustrating exposure processing in accordance with the first embodiment;

FIGS. 8A to 8C are diagrams illustrating the relationship between the sensitivity of a color paper and the transmittance distribution of each of R, G, and B filters of a filter unit, in which FIG. 8A is a diagram illustrating the wavelength band of red, FIG. 8B is a diagram illustrating the wavelength band of green, and FIG. 8C is a diagram illustrating the wavelength band of blue;

FIGS. 17A to 17F are diagram illustrating problems of the conventional art and the effects of the present invention.

DESCRIPTION OF THE PREFERRED EMBODIMENTS

Referring now to the accompanying drawings, a detailed description will be given of the embodiments of the present invention.

First Embodiment

Figure 1:
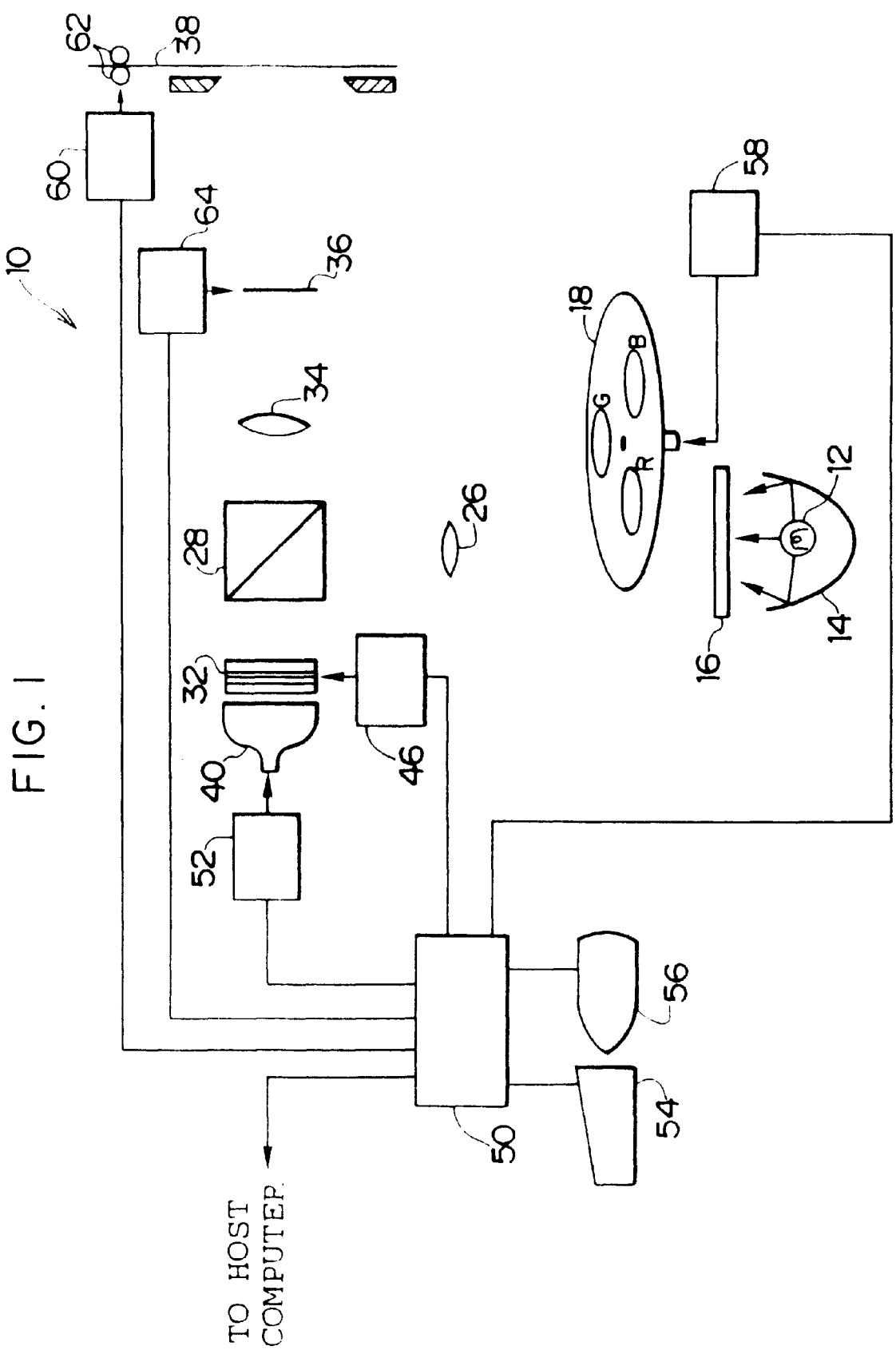
FIG. 1 is a schematic diagram illustrating the configuration of a photographic printer in accordance with a first embodiment of the present invention.

As shown in FIG. 1, a photographic printer 10 to which the present invention is applied is provided with a lamp 12 for emitting reading light which will be described later, and the lamp 12 is installed inside a reflector 14. An infrared/ultraviolet cutoff filter 16 for cutting off wavelengths which are not required for exposure is disposed above the reflector 14. A disk-shaped filter unit 18, in which exposure filters of three colors, red (R), green (G), and blue (B) (hereafter respectively referred to as the R filter, G filter, and B filter) are fixed, is disposed above the infrared/ultraviolet cutoff filter 16. The filter unit 18 is rotatively driven by a filter driving unit 58 so that each of the R, G, and B filters stops at a position on the optical path.

A polarizing beam splitter 28 for dividing a bundle of rays into two, as will be described later, is disposed above the filter unit 18. A collimator lens 26 for causing the light transmitted through each of the filters of the filter unit 18 to be made incident upon the polarizing beam splitter 28 as parallel rays is disposed below the polarizing beam splitter 28 and above the filter unit 18.

A spatial light modulating element 32 (to be described later in detail) is disposed on one side of the polarizing beam splitter 28. A bias voltage of a predetermined frequency is applied to the spatial light modulating element 32 from a modulating-element controlling unit 46 for controlling the spatial light modulating element 32. An image writing CRT 40, on which a fluorescent material having a luminous wavelength substantially coinciding with the sensitive wavelength of the photoconductive layer of the spatial light modulating element 32 is coated, is disposed on one side of the spatial light modulating element 32. This image writing CRT 40 is for writing images of R, G, and B to the spatial light modulating element 32 as light patterns by means of light. Incidentally, as the image writing CRT 40, it is possible to use, for example, a high-resolution noninterlaced CRT having 2,048 I 2,580 pixels. The writing of images by the image writing CRT 40 is controlled by a writing CRT control unit 52.

Meanwhile, an exposing projection lens 34 for enlarging and exposing an image written to the spatial light modulating element 32 as a light pattern onto color paper 38 serving as an image receiving element is disposed on the side of the polarizing beam splitter 28 which is opposite the side thereof where the spatial light modulating element 32 is disposed. A shutter 36 is interposed between the exposing projection lens 34 and color paper 38. It should be noted that, in this embodiment, a shutter which makes use of the electro-optical effect of a Pockels cell or the like and which is not a mechanical shutter is used. The shutter 36 is opened and closed by a shutter driving unit 64. Incidentally, color paper 38 is moved to a predetermined exposing position by the driving power of a roller driving unit 60 for driving drawing rollers 62.

Figure 2:
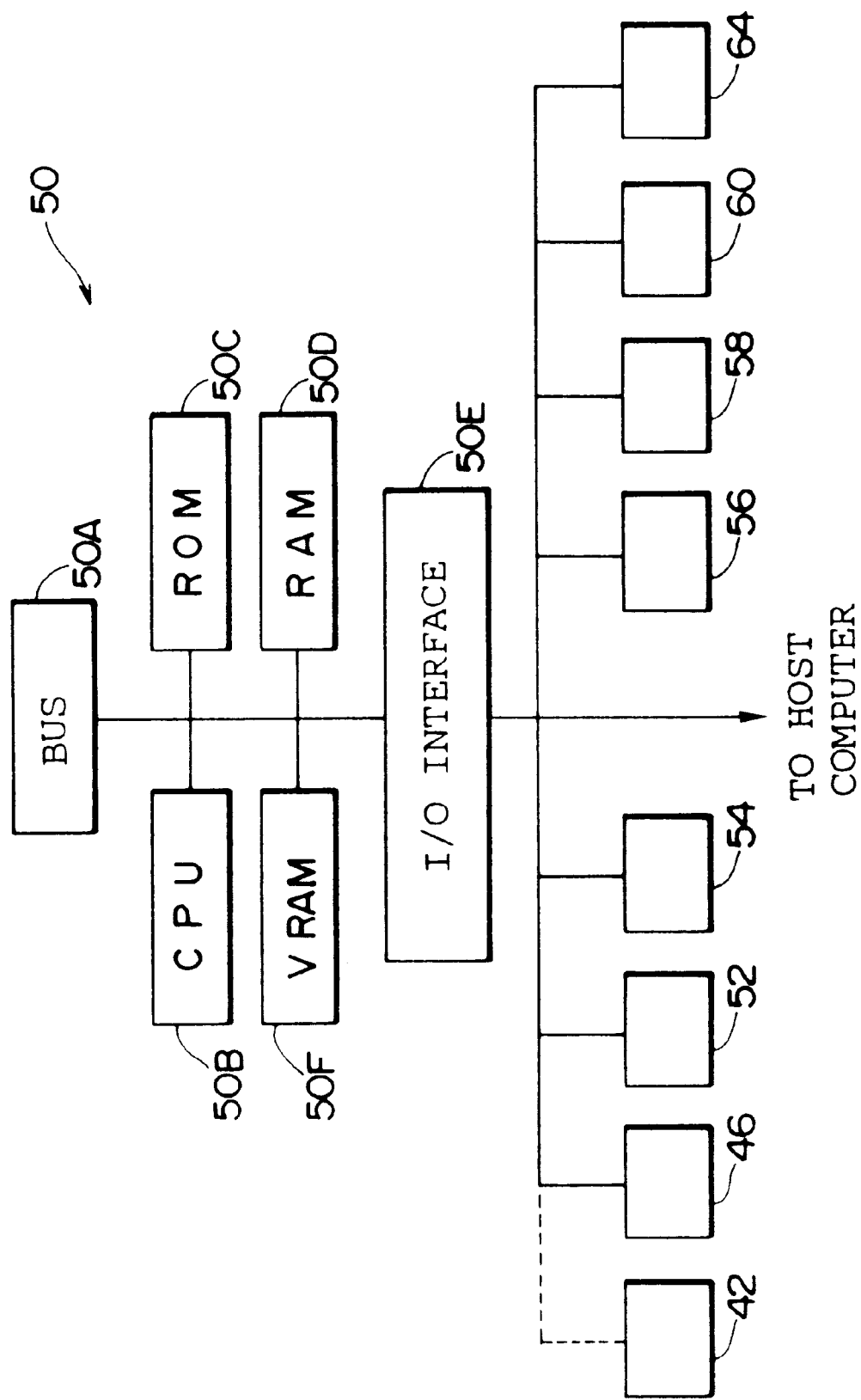
FIG. 2 is a block diagram illustrating the configuration of a controller of the photographic printer.

The control units 46 and 52 and the driving unit 58, 60, and 64 mentioned above are connected to a controller 50. As shown in FIG. 2, the controller 50 has a bus 50A. A CPU 50B, a ROM 50C, a RAM 50D, a VRAM 50F for storing image data, and an I/O interface 50E are connected to the bus 50A. Connected to the I/O interface 50E are the control units 46 and 52 and the driving unit 58, 60, and 64, as well as a keyboard 54 for operating the controller 50 and an interlaced display 56 for displaying the operating condition of the controller 50 and capable of displaying images.

Also, the I/O interface 50E is connected to a host computer for supplying image data to the controller 50, via network (not shown) such as a LAN. Image data, in which an image to be recorded on color paper 38 is represented by gradation values (density values or luminance values) for the respective colors, R, G, and B, of the pixels constituting that image, is supplied from this host computer. It should be noted that, as for image data, the gradation values of the pixels for the respective colors, R, G, and B, can be respectively represented by 8-bit data, for example. In this case, the number of gradations of the pixels for the respec- tive colors, R, G, and B, which can be represented by the image data is 256. Image data supplied from the host computer is stored in the VRAM 50F.

Figure 3:
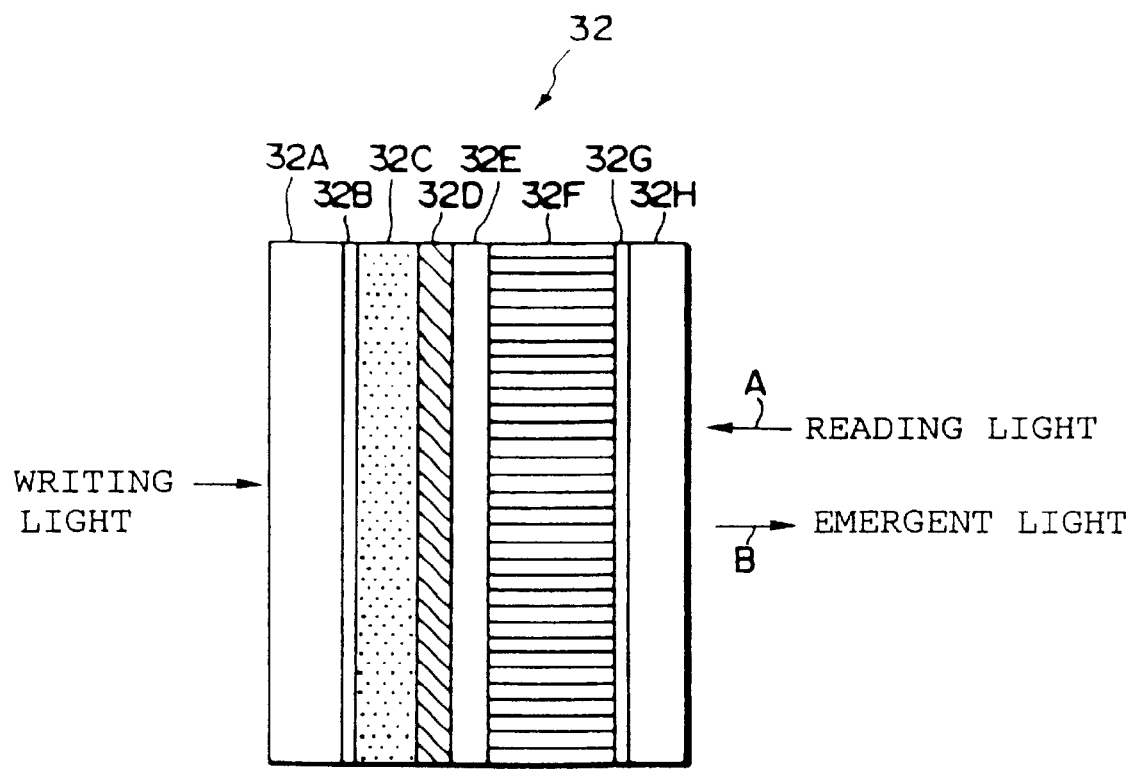
FIG. 3 is a schematic diagram illustrating the configuration of a spatial light modulating element.

As shown in FIG. 3, the spatial light modulating means 32 is arranged so that a glass substrate layer 32A, a transparent electrode layer 32B, a photoconductive layer 32C, a light shielding layer 32D, a dielectric reflecting layer 32E, a light modulating layer 32F, a transparent electrode layer 32G, and a glass substrate layer 32H are consecutively superposed one on top of the other. The aforementioned bias voltage of the predetermined frequency is applied between the transparent electrode layers 32B and 32G. In the light modulating layer 32F, a nematic liquid crystal having negative dielectric anisotropy is oriented homeotropically. Orientation layers (not shown) for uniformly orienting the liquid crystal are provided on both sides of the light modulating layer 32F.

The electrical resistance value of the photoconductive layer 32C is selected so that electrical resistance value $R_{OFF}$ per unit when light is not incident upon the glass substrate layer 32A side and electrical resistance value $R_{ON}$ per unit when light is incident thereupon assume the following Formula (1) with respect to electrical resistance value $R_{LC}$ per unit of the light modulating layer 32F.

$$R_{OFF} >> R_{LC} >> R_{ON} \qquad (1)$$

For this reason, when light is not incident upon the glass substrate layer 32A side, a major portion of the bias voltage is applied to the photoconductive layer 32C, and insufficient voltage is applied to the light modulating layer 32F connected in a series with the photoconductive layer 32C. Consequently, the electro-optical effect based on the liquid crystal is not produced in the light modulating layer 32F. When the light is incident upon the glass substrate layer 32A side, the electrical resistance in the photoconductive layer 32C is lowered, and sufficient voltage is applied to the light modulating layer 32F, thereby producing the electro-optical effect.

In a case where the light incident upon the glass substrate layer 32A side is a light pattern having an intensity distribution corresponding to the image to be recorded (i.e., if writing light from the image writing CRT 40 is applied), a voltage distribution corresponding to this intensity distribution is applied to the light modulating layer 32F, so that an image (more specifically, the pattern of arrangement of liquid crystal molecules) corresponding to the intensity distribution of the applied light pattern (writing light) is formed in the light modulating means 32F by the electro-optical effect, thereby allowing the light pattern to be written to the light modulating layer 32F. The dielectric reflecting layer 32E is constituted by a dielectric reflecting multilayered film which is formed of $TiO_2/SiO_2$ or the like.

For this reason, if a bundle of rays (a bundle of rays in the direction of arrow A in FIG. 3; hereafter referred to as reading light) is incident upon the glass substrate 32H side, reading light is reflected by the dielectric reflecting layer 32E, fetches information on the image formed by the aforementioned electro-optical effect (is modulated in correspondence to the pattern of arrangement of liquid crystal molecules), and exits toward the glass substrate 32H side. As a result, the light pattern written to the light modulating layer 32F of the spatial light modulating element 32 is read. Incidentally, the light shielding layer 32D absorbs light which has passed through the dielectric reflecting layer 32E out of reading light, thereby preventing reading light from being incident upon the photoconductive layer 32C side.

The polarizing beam splitter 28 is a prism beam splitter which is formed by joining, at a 45° plane, two prisms having different refractive indexes. The polarizing beam splitter 28 has a function whereby transmitted light, which was transmitted through one of the R, G, and B filters, was converted to parallel rays of light by the collimator lens 26, and was made incident upon the polarizing beam splitter 28, is polarized 90° with respect to the direction of travel (optical axis) at a cemented surface, and is made emergent as reading light. Also, the polarizing beam splitter 28 has the function of a type of filter whereby when emergent light from the spatial light modulating element 32 is incident upon the polarizing beam splitter 28, depending on the form of polarization of emergent light, emergent light is reflected at the cemented surface and is polarized 90° so as to be made emergent toward the collimator lens 26 side, or the aforementioned emergent light is made emergent toward the exposing projection lens 34 side without being reflected at the cemented surface.

Next, a description will be given of image exposure processing which is executed by the photographic printer 10 in terms of operation in accordance with the first embodiment. Incidentally, it is assumed that the temperature of the lamp 12 has reached a predetermined stable temperature, and that the image data representing the image to be recorded on color paper 38 has already been received from the host computer and has been stored in the VRAM 50F.

Figure 4:
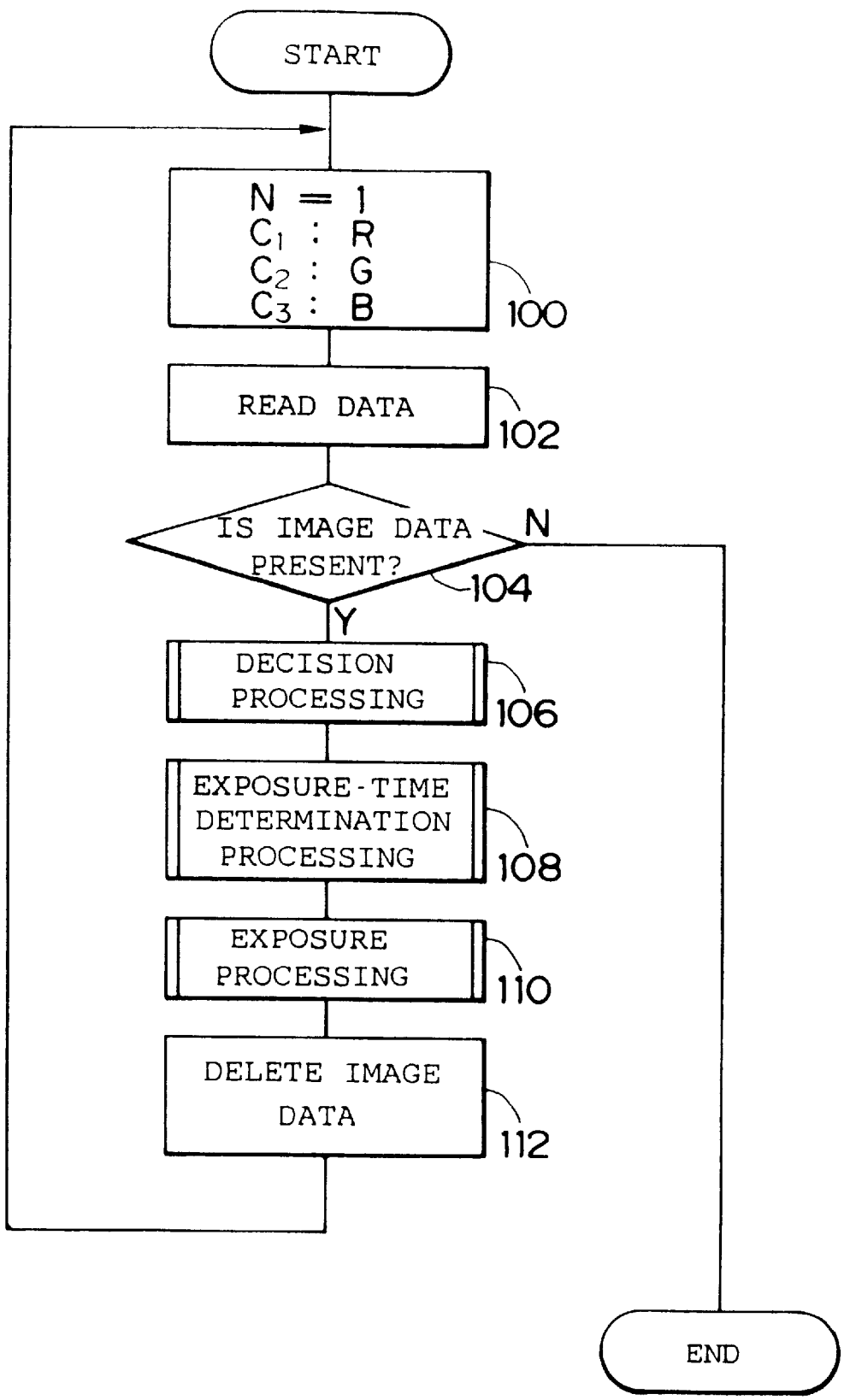
FIG. 4 is a flowchart illustrating a procedure of exposure of the photographic printer in accordance with the first embodiment.

In Step 100 in FIG. 4, initialization is effected, i.e., N is set as 1, and a definition is provided that $C_1$, $C_2$, and $C_3$ are assumed to represent R, G, and B, respectively. In ensuing Step 102, data such as standard enlargement magnification and trimming reference position, which is recorded in the ROM 50C, is read and stored in the RAM 50D.

Figure 5:
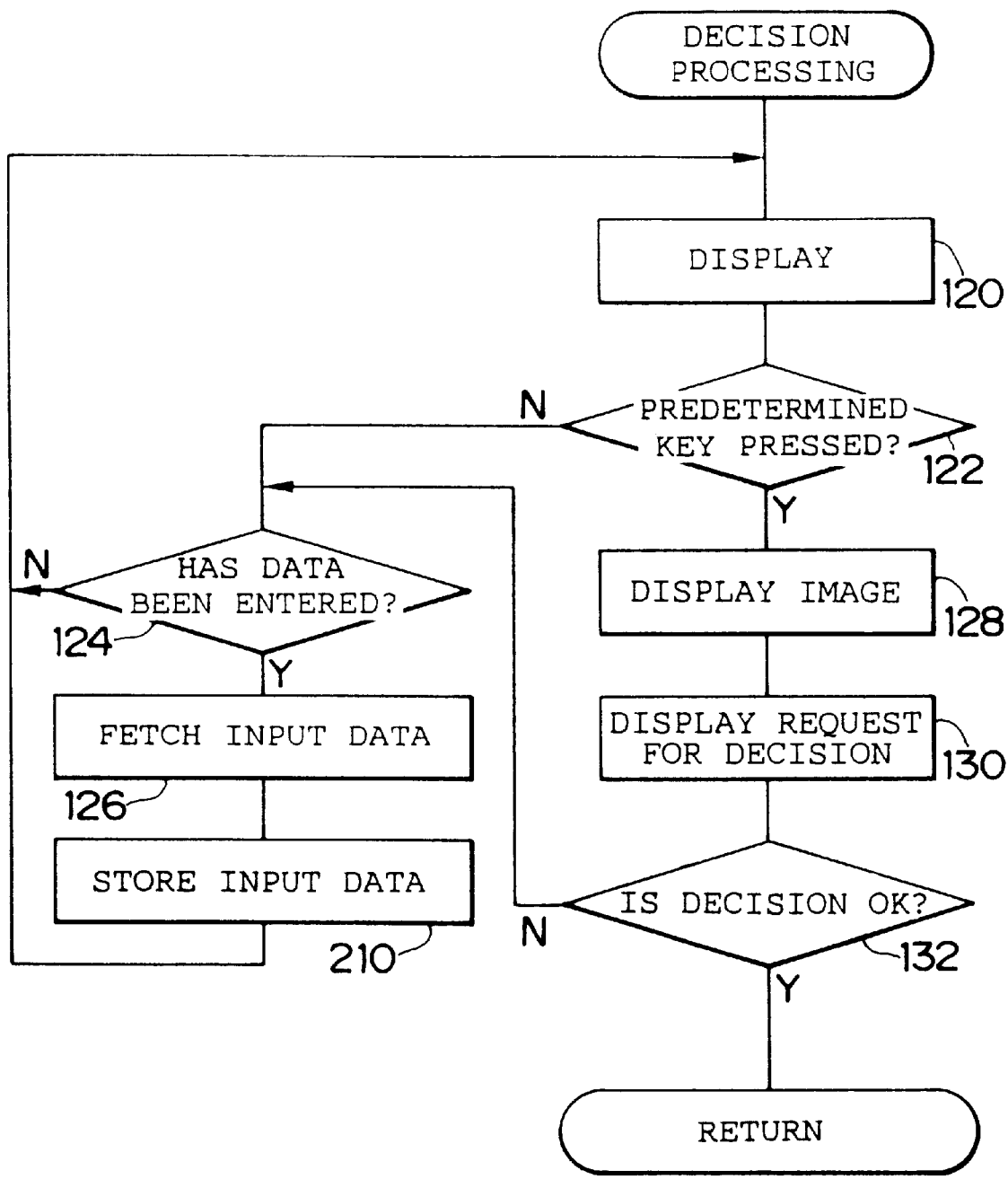
FIG. 5 is a flowchart illustrating decision processing in accordance with the first embodiment.

In ensuing Step 104, a determination is made as to whether or not image data has been stored in the VRAM 50F. If YES is the answer in the determination, the decision processing shown in FIG. 5 is executed in ensuing Step 106.

In Step 120, data which has been read, such as standard enlargement magnification and trimming reference position, is displayed on the display 56, and a determination is made in ensuing Step 122 as to whether or not a predetermined key (e.g., a return key) on the keyboard 54 has been pressed.

If NO is the answer in the determination, a determination is made in ensuing Step 124 as to whether or not data has been entered from the keyboard 54. As data which is entered here, data for, for example, changing standard enlargement magnification and trimming reference position is included. If NO is the answer in the determination, the operation returns to Step 120, whereas if YES is the answer in the determination, the entered data is fetched in ensuing Step 126. Subsequently, in Step 210, fetched data is stored in the RAM 50D, and the operation returns to Step 120. Accordingly, if data is entered from the keyboard 54, changed data is displayed on the display 56.

Meanwhile, if YES is the answer in the determination in Step 122, image data corresponding to a one-frame portion of image data stored in the VRAM 50F is read and displayed on the display 56 as an image in Step 128. Accordingly, both data displayed in Step 120 and the image displayed in Step 128 are displayed on the display 56.

In ensuing Step 130, in order to allow an operator to make a decision as to whether exposure is to be effected in this state, a display is given to the effect that a decision is requested. In ensuing Step 132, a determination is made as to whether or not a predetermined decision key (e.g., a Y key) has been pressed so as to make a determination as to whether or not the decision is acceptable. If NO is the answer in the determination, the operation proceeds to Step 124 to satisfy the conditions desired by the operator.

Incidentally, in Step 124, a timer may be set to give leeway in time to the operator in making the decision. As this timer, an internal clock of the CPU 50B or the like shown in FIG. 2 may be used. On the other hand, if YES is the answer in the determination, the decision processing subroutine ends, so that the operation proceeds to Step 108 in FIG. 4.

Figure 6:
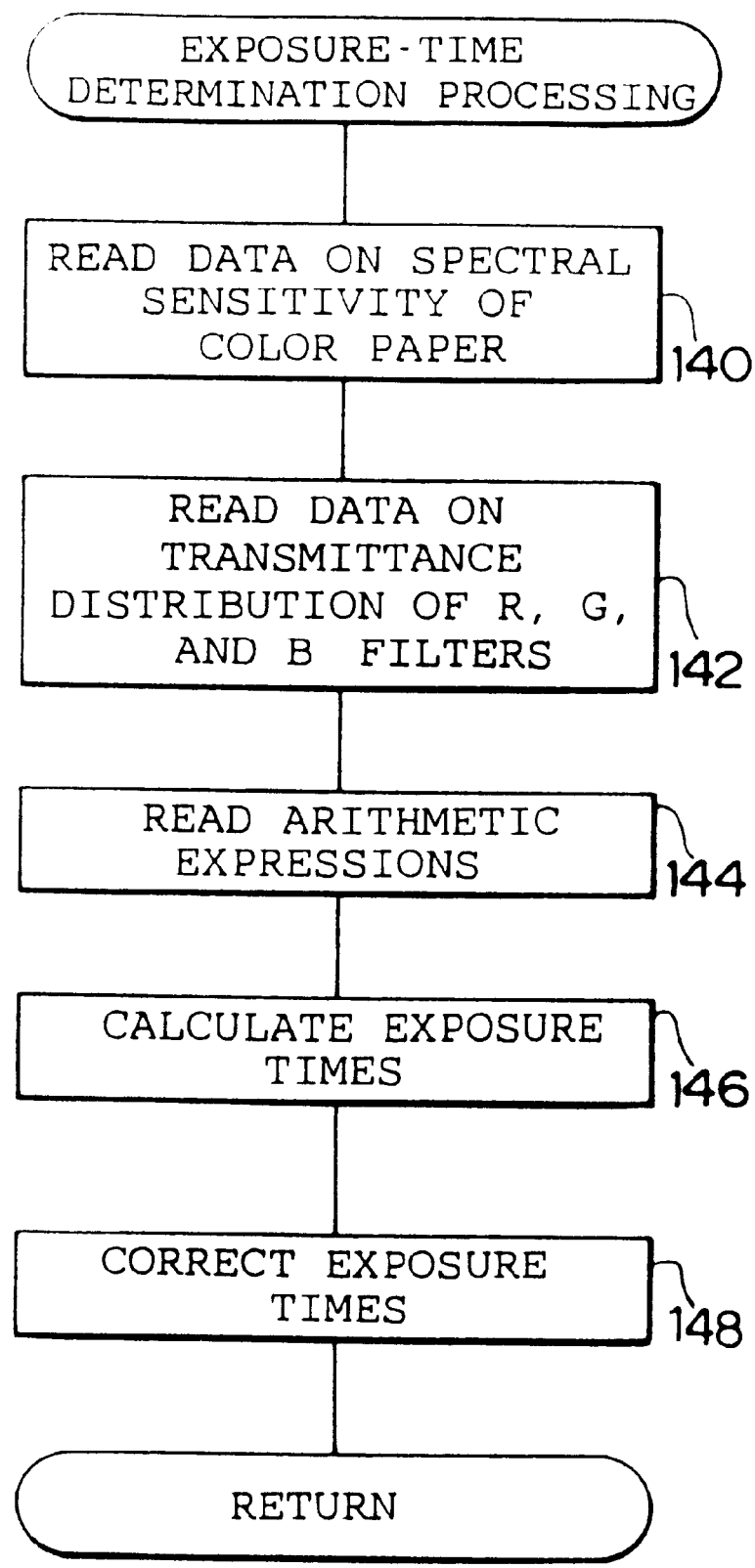
FIG. 6 is a flowchart illustrating exposure-time determination processing in accordance with the first embodiment.

In Step 108, the exposure-time determination processing shown in FIG. 6 is executed. First, in Step 140, data on the spectral sensitivity of color paper is read from the ROM 50C and, in ensuing Step 142, data on the transmittance distribution of the respective R, G, and B filters is read from the ROM 50C. Here, referring to FIGS. 8A to 8C, description will be given of the relationship between the spectral sensitivity of color paper and the transmittance distribution of R, G, and B filters in accordance with this embodiment.

Figure 8A:
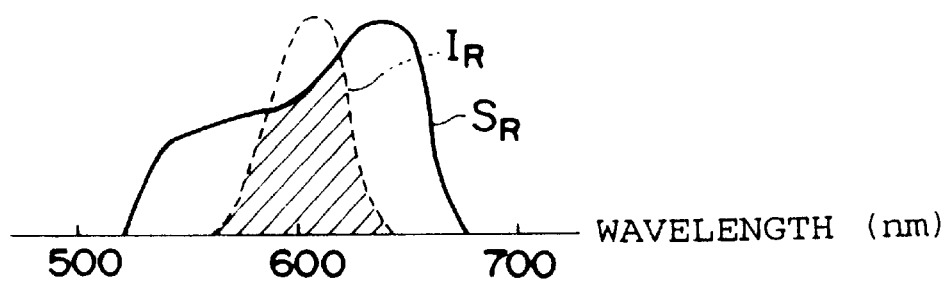

As shown in FIG. 8A, the sensitivity in the R wavelength band of color paper 38 has characteristic $S_R$ indicated by the solid line, and the transmittance distribution of the R filter has a characteristic indicated by the dotted line. Accordingly, if light transmitted through the R filter, light which contributes to the color development of R is the portion which is indicated by the slanted lines. It should be noted that illuminance on the surface of color paper 38 of the light transmitted through the R filter is assumed to be $I_R$.

Figure 8B:
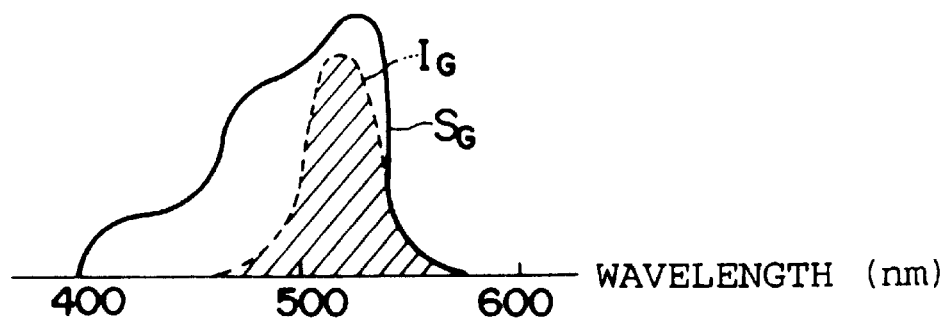

Similarly, as shown in FIG. 8B, the sensitivity in the G wavelength band of color paper 38 has characteristic SG indicated by the solid line, and the transmittance distribution of the G filter has a characteristic indicated by the dotted line. Accordingly, if light transmitted through the G filter, the light which contributes to the color development of G is the portion which is indicated by the slanted lines. It should be noted that illuminance on the surface of color paper 38 of the light transmitted through the G filter is assumed to be $I_G$.

Figure 8C:
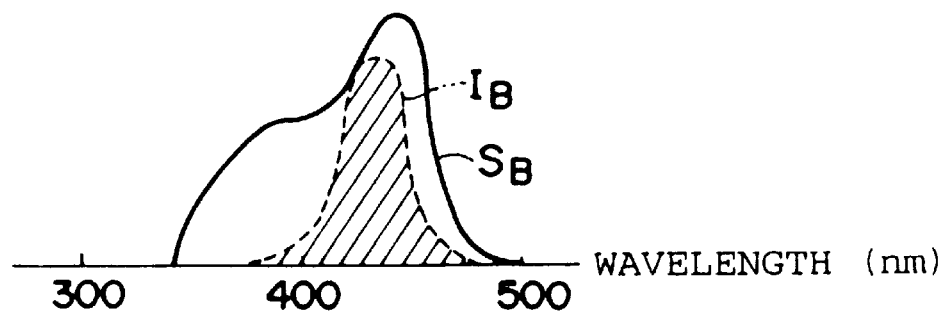

Further, as shown in FIG. 8C, the sensitivity in the B wavelength band of color paper 38 has characteristic $S_B$ indicated by the solid line, and the transmittance distribution of the B filter has a characteristic indicated by the dotted line. Accordingly, if light transmitted through the B filter, light which contributes to the color development of B is the portion which is indicated by the slanted lines. It should be noted that illuminance on the surface of color paper 38 of the light transmitted through the B filter is assumed to be $I_B$.

In addition, in this embodiment, the sensitivity of color paper with respect to the colors, R, G, and B, and the transmittance distribution of the filters are set so that the color-development finished density of color paper 38 becomes maximum when the intensity of reading light on the spatial light modulating element 32 is maximum (when modulated into a P wave, as will be described later).

As is apparent from FIGS. 8A to 8C, since the sensitivity of color paper is small relative to the transmittance distribution of the R filter, a long exposure time is required for R to undergo color development into a predetermined density as compared to G and B. From the standpoint of reducing exposure times, it is unnecessary to use color paper having such a characteristic. That is, it goes without saying that the reason for using such color paper in this embodiment is merely for the sake of describing the invention.

In ensuing Step 144, arithmetic expressions for determining exposure times for the respective colors, R, G, and B, are read from the ROM 50C, and are stored in the RAM 50D. If the light intensities of respective colors, R, G, and B, on color paper 38 are assumed to be $E_R$, $E_G$, and $E_B$, exposure amounts for the respective colors, R, G, and B, can be respectively represented by $\log E_R$, $\log E_G$, and $\log E_B$. Here, if theoretical exposure times (hereafter simply referred to as times) for the respective colors, R, G, and B, are respectively assumed to be $t_R$, $t_G$, and $t_B$, light intensities $E_R$, $E_G$, and $E_B$ for the respective colors, R, G, and B, can be respectively expressed by the following formulas:

$$E_R = I_R \times t_R \quad (2)$$

$$E_G = I_G \times t_G \quad (3)$$

$$E_B = I_B \times t_B \quad (4)$$

Figure 9:
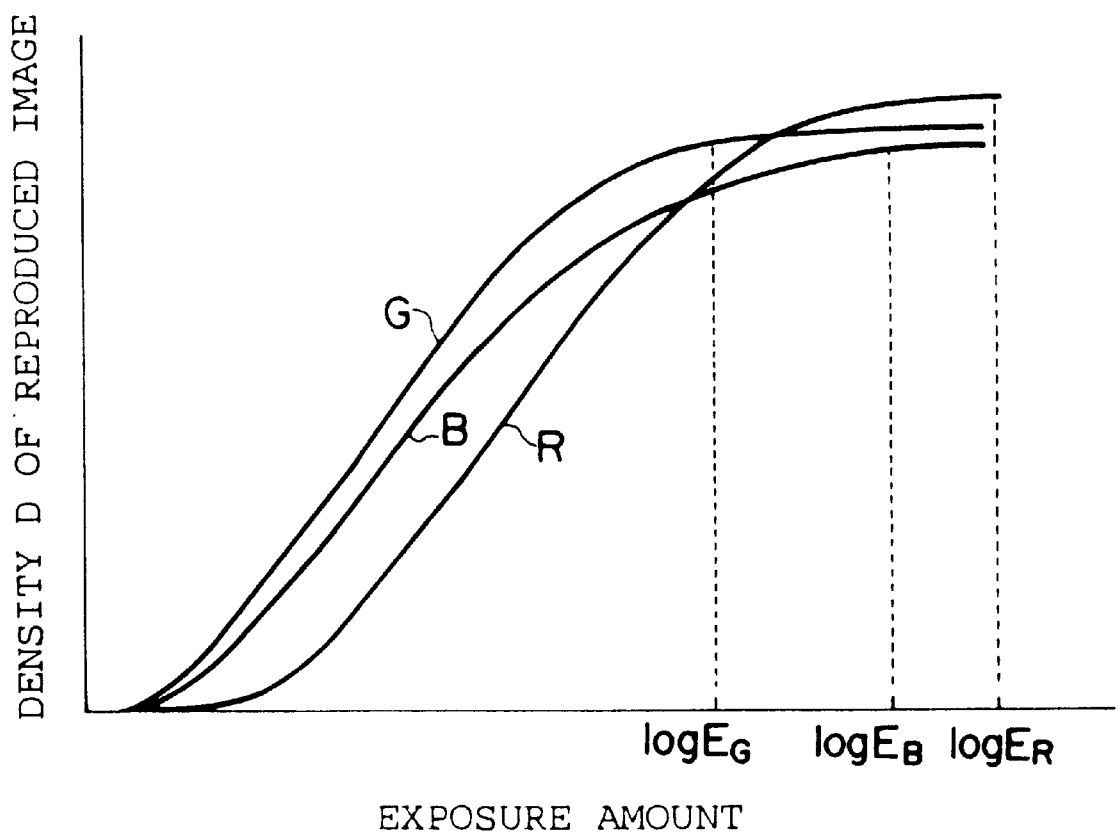
FIG. 9 is a diagram illustrating the relationship between the density of a reproduced image on the color paper and the exposure amount with respect to red, green, and blue.

Accordingly, in Step 144, Formulas (2) to (4) above are read. Incidentally, if the density of color paper 38 is taken as the ordinate and the exposure amount is taken as the abscissa, color development characteristics for the respective colors, R, G, and B, are shown in FIG. 9. Exposure amounts $\log E_R$, $\log E_G$, and $\log E_B$ for obtaining an R image, a G image, and a B image having desired densities can be determined from the characteristics shown in FIG. 9.

Next, in Step 146, exposure times for the images of the respective colors, R, G, and B, are calculated. One of the characteristics of the present invention is that the exposure time is determined so that the exposure for each of the colors, R, G, and B, is completed in a duration corresponding to a minimum value of integral multiples of the vertical scanning period in synchronization with the vertical scanning of the image writing CRT 40. In Step 146, times $t_R$, $t_G$, and $t_B$ are calculated from Formulas (2) to (4) and, on the basis of calculated values, respective exposure times $T_R$, $T_G$, and $T_B$ for R, G, and B are calculated so that exposure times coincide with durations which are respectively equal to or greater than times $t_R$, $t_G$, and $t_B$ and correspond to minimum values of integral multiples of the vertical scanning period of the image writing CRT 40.

Here, referring to FIGS. 10A to 10F, a detailed description will be given of the calculating process of determining exposure times $T_R$, $T_G$, and $T_B$. In this embodiment, it is assumed that the image display period (vertical scanning period) of the image writing CRT 40 based on a video signal is 30 ms, that the pulse width of a vertical synchronization signal in which pulses are generated at a timing synchronous with the blanking period of the vertical scanning of the image writing CRT 40 is 763 μs, and that the pulse interval is 33 ms.

Figure 10:
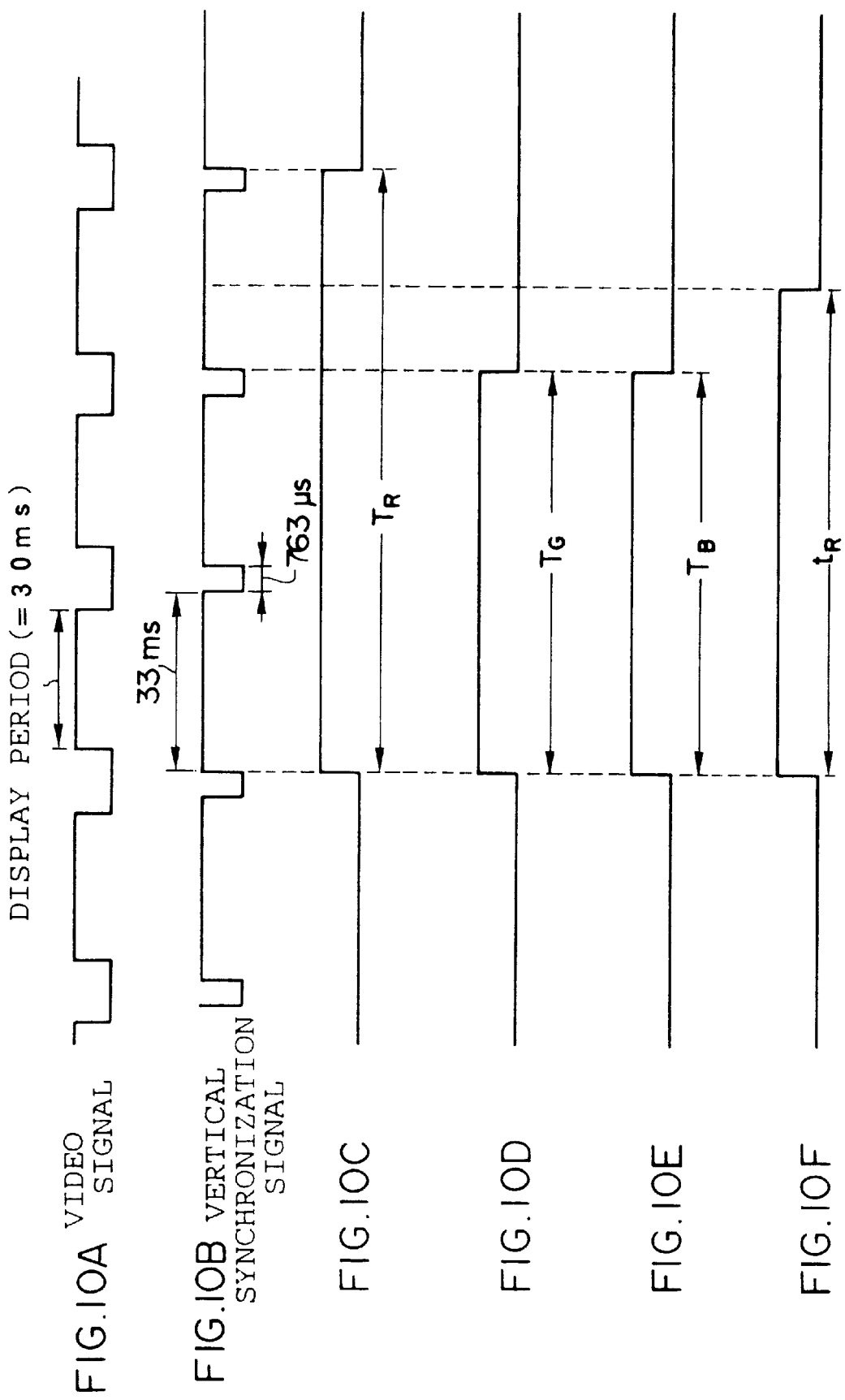
FIGS. 10A and 10B are timing charts respectively illustrating a video signal and a vertical synchronization signal of an image writing CRT.
FIGS. 10C, 10D, and 10E are timing charts respectively illustrating an exposure time for red, an exposure time for green, and an exposure time for blue.
FIG. 10F is a timing chart illustrating a theoretical exposure time.

FIG. 10F shows a visual representation of the result of calculation of time $t_R$ ($= E_R/I_R$) based on Formula (2) above. Exposure time $T_R$ shown in FIG. 10C is obtained by rounding up the time $t_R$ so that the time $t_R$ coincides with the time $T_R$ which is greater than or equal to the time $t_R$ and corresponds to a minimum value of integral multiples of the vertical scanning period (the period of the vertical synchronization signal) of the image writing CRT 40. Accordingly, in this embodiment, time $t_R$ is calculated from Formula (2), and exposure time $T_R$ is obtained by rounding up time $t_R$ so that time $t_R$ coincides with time $T_R$ which is equal to or greater than time $t_R$ and corresponds to a minimum value of integral multiples of the vertical scanning period of the image writing CRT 40. Also, exposure times $T_G$ and $T_B$ are determined in a similar manner (see FIGS. 10D and 10E). In this way, in Step 146, the exposure times for the respective colors are calculated, and the calculated exposure times are stored in the RAM 50D.

Although, in the above, exposure times $T_R$, $T_G$, and $T_B$ are made to accurately coincide with integral multiples of the vertical scanning period, exposure times $T_R$, $T_G$, and $T_B$ may not accurately coincide with integral multiples of the vertical scanning period (may be approximate values) if the start and end of exposure are carried out within the blanking period of vertical scanning (not within the display period of the video signal (within the period when the video signal is at a low level)).

In ensuing Step 148, image data correction for each of R, G, and B is effected in which an exposure amount corresponding to difference, $\Delta t_N$ (where N means one of R, G, and B) between exposure time $T_N$ for actually applying a light pattern to color paper 38 and time $t_N$ as a theoretical value is compensated for by correcting the image data stored in the VRAM 50F. The exposure amount corresponding to difference $\Delta t_N$ can be calculated from Formulas (2) to (4) above. In addition, since the characteristics of reading light, the characteristics of color paper, and the characteristics of the R, G, and B filters are already known, this adjustment can be effected by adjusting emergent light from the spatial light modulating element 32. Since the adjustment of this emergent light can be realized by adjusting writing light, it suffices if the image data stored in the VRAM 50 is corrected.

Accordingly, in Step 148, a one-frame portion of image data stored in the VRAM 50F is read, gradation values for R, G, and B of all pixels making up the one-frame portion of the image data are altered so as to correct image data, and corrected image data is stored again in the VRAM 50F. When the correction of image data is completed as described above, exposure-time determination processing ends, and the operation proceeds to Step 110 in FIG. 4.

In Step 110, exposure processing shown in FIG. 7 is executed. First, in Step 160, color paper 38 is moved in a predetermined direction by a predetermined amount by driving the drawing rollers 62 in the roller driving unit 60.

Next, in Step 162, a $C_N$ filter (as defined in Step 100 in FIG. 4, the value of N at this point in time being 1, and $C_1$ denoting R) which is fixed in the filter unit 18 is set on the optical path by the filter driving unit 58. As a result, light emitted from the lamp 12 is transmitted through the infrared/ultraviolet cutoff filter 16 and the R filter directly or after being reflected by the reflector 14, is converted into parallel rays of light by the collimator lens 26, and is then separated into a P wave and an S wave at the cemented surface of the prism of the polarizing beam splitter 28.

Figure 11:
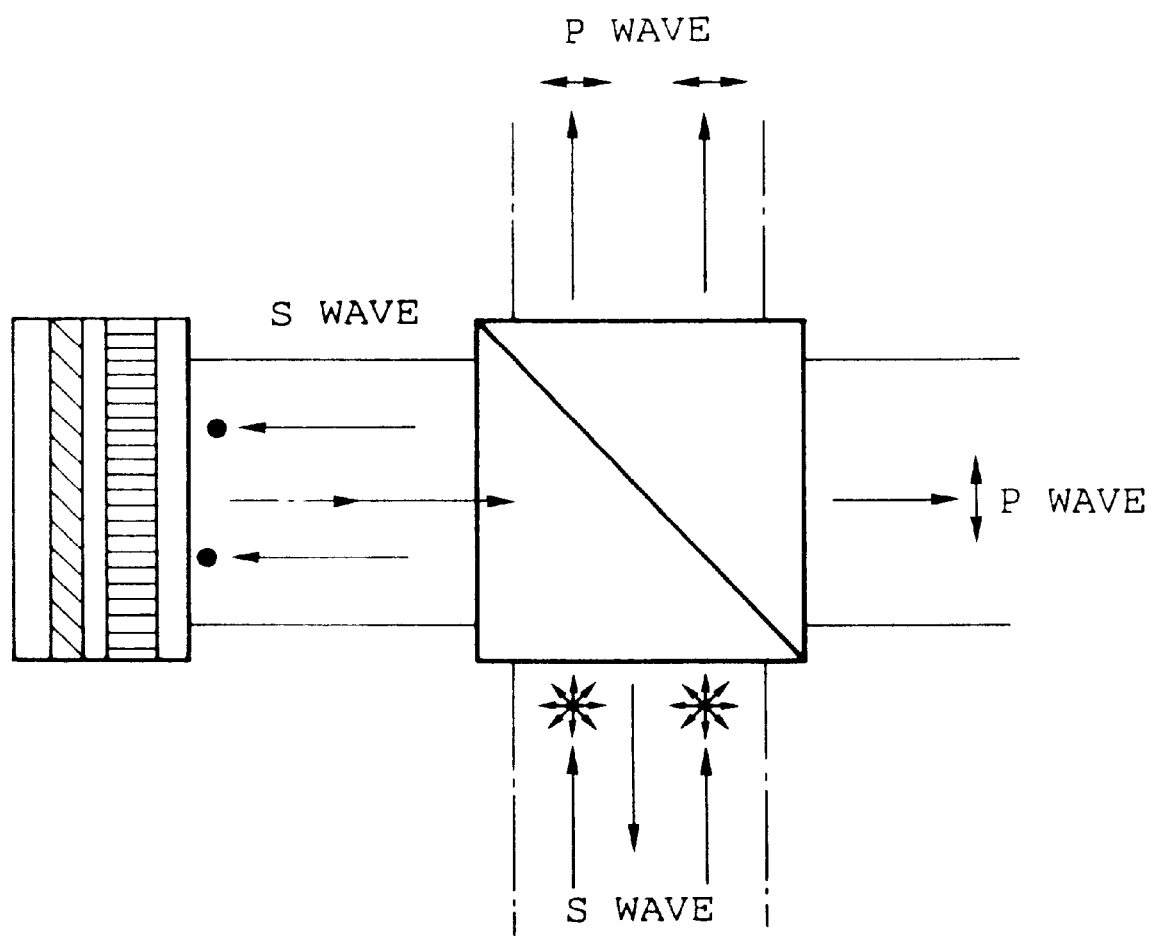
FIG. 11 is an explanatory diagram illustrating the relationship between a polarizing beam splitter and the spatial light modulating element with respect to reading light and emergent light.

As shown in FIG. 11, the P wave (light whose polarizing direction is parallel to the plane of the drawing in FIG. 11) is transmitted through the polarizing beam splitter 28, while the S wave (light whose polarizing direction is perpendicular to the plane of the drawing in FIG. 11) is reflected at the cemented surface of the prism and emerges toward the spatial light modulating element 32 side.

Meanwhile, in the spatial light modulating element 32, since light is not incident upon the glass substrate layer 32A side, a major portion of bias voltage is applied to the photoconductive layer 32C, and insufficient voltage is applied to the light modulating layer 32F connected in series with the photoconductive layer 32C. Hence, the long axes of liquid crystal molecules and the optical axis of the transmitted reading light coincide with each other, so that the electro-optical effect due to birefringence does not occur (see FIG. 3). For this reason, reading light of the S wave is reflected by the dielectric reflecting layer 32E, is made emergent from the spatial light modulating element 32 in the form of the S wave, and is made incident upon the polarizing beam splitter 28. Light of the S wave incident upon the polarizing beam splitter 28 is reflected toward the collimator lens 26 side by the cemented surface of the polarizing beam splitter 28. Accordingly, light of the S wave incident upon the polarizing beam splitter 28 is not made emergent toward the exposing projection lens 34 side (see FIG. 11).

In ensuing Step 164, of the one-frame portion of image data corrected in Step 148 (image data corrected in Step 148 in FIG. 6 described earlier), data representing the gradation value of $C_N$, i.e., R, of each pixel is read. Further, after data which has been read is subjected to processing, such as enlargement or reduction based on the enlargement magnification or the trimming position which have been set or extraction of a portion to be recorded on color paper, processed data is output to the writing CRT control unit 52, thereby causing the writing CRT control unit 52 to write a $C_N$ image to the image writing CRT 40.

As a result, a pattern of light (writing light) having an intensity distribution corresponding to the $C_N$ image is made emergent from the image writing CRT 40. Because this writing light is made incident upon the spatial light modulating element 32 from the glass substrate layer 32A side, in the light modulating layer 32F of the spatial light modulating element 32, liquid crystal molecules are inclined in a direction perpendicular to the electrical field of the applied voltage in correspondence with the intensity distribution of writing light, so that an arrangement pattern of liquid crystal molecules corresponding to the $C_N$ image is formed (the $C_N$ image is written).

In addition, because the liquid crystal molecules are inclined in the direction perpendicular to the electrical field of the applied voltage, the long axes of the liquid crystal molecules and the optical axis of the transmitted reading light intersect with each other, exhibiting birefringence. Accordingly, reading light made incident in the form of the S wave, when passing through the liquid crystal of the light modulating layer 32F, is converted into elliptical polarized light or circular polarized light. Here, the degree of modulation of reading light changes in correspondence with the $C_N$ image written to the spatial light modulating element 32, and at the time of maximum modulation reading light is modulated into the P wave and exits from the spatial light modulating element 32 toward the polarizing beam splitter 28 side. The P wave which has entered the polarizing beam splitter 28 is transmitted through the cemented surface of the polarizing beam splitter 28, is made emergent from the polarizing beam splitter 28 as a light pattern having an intensity distribution corresponding to the $C_N$ image, is enlarged to a predetermined magnification by the exposing projection lens 34, and reaches the position where the shutter 36 is disposed.

In ensuing Step 166, exposure time $T_R$ stored in the RAM 50D in Step 146 is read, and exposure time $T_R$ is set as the set time of a $C_N$ timer. Next, in Step 168, the shutter 36 is opened by the shutter driving unit 64 in synchronization with the vertical scanning signal, as shown in FIG. 10C. Thus, in this embodiment, since the shutter 36 is opened and closed in synchronization with the vertical scanning signal, a shutter such as the Pockels cell or the like, which opens and closes quickly.

Next, in Step 170, a determination is made as to whether or not time is out, i.e., whether exposure time $T_R$ has elapsed after the opening of the shutter 36. If NO is the answer in the determination, the operation returns to Step 168, while if YES is the answer in the determination, the shutter 36 is closed by the shutter driving unit 64 in ensuing Step 172. Thus, the shutter 36 is opened for a duration which is an integral multiple of the vertical scanning period of the image writing CRT 40, and the start and end of opening are effected in synchronization with vertical scanning of the image writing CRT 40. As a result, the image of R is exposed and recorded on color paper 38.

In ensuing Step 174, a determination is made as to whether or not the images of the respective colors, R, G, and B, have been exposed and recorded on color paper 38, by making a determination whether or not N is 3. If NO is the answer in the determination, N is incremented by 1 in Step 176, and the operation returns to Step 162. Since the incrementation sets N into 2, with respect to G, a G image is exposed and recorded on color paper 38 in the same way as the above-described case of R. Further, in Step 176, N is incremented from 2 to 3, and with respect to B, a B image is exposed and recorded on color paper 38 in the same way as the case of R.

On the other hand, if YES is the answer in the determination in Step 174, the exposure and recording of the respective images of R, G, and B on color paper 38 are finished, and the formation of a reproduced color image on color paper 38 is completed. Hence, exposure processing ends, and the operation proceeds to Step 112 in FIG. 4.

In Step 112, image data for which exposure processing has been finished is deleted from the VRAM 50F, and the operation returns to Step 100.

In the above-described manner, in the photographic printer 10 in accordance with this embodiment, one-frame portions of image data stored in the VRAM 50F are consecutively processed so as to form reproduced images on color paper 38. It should be noted that if it is determined in Step 104 that there is no image data in the VRAM 50F, the formation of all reproduced images has been completed, so that image exposure processing ends.

Figure 17C:
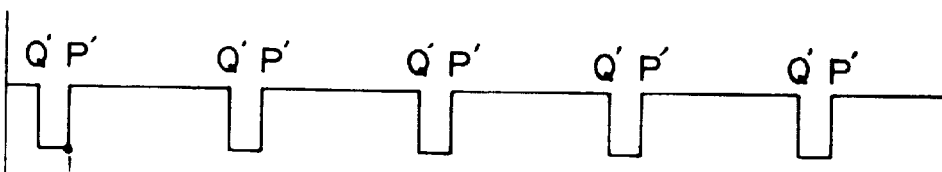
Figure 17D:
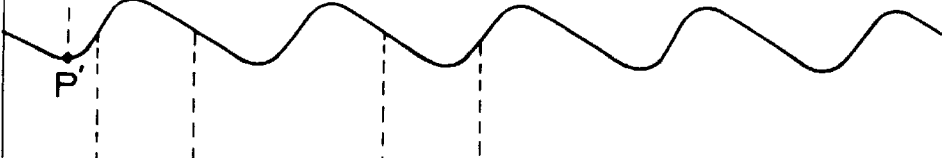

As described above, the start and end of exposure in this embodiment are synchronized with vertical scanning of the image writing CRT 40, and exposure times are set to coincide with durations corresponding to minimum values of integral multiples of the vertical scanning period. Accordingly, reading light from the spatial light modulating element 32 is applied to color paper only during a duration which is an integral multiple of the duration (vertical scanning period) from point P' until point Q' shown in FIGS. 17B and 17C. For this reason, an integrated value (or average value) of reflectance, as viewed from the color paper side, at point P' shown in FIG. 17B, for example, is fixed, so that if a comparison is made among a plurality of reproduced images, deviations in color tone and density unevenness do not occur, and the finished quality of the plurality of reproduced images is substantially fixed.

Although, in this embodiment, the theoretical exposure time is rounded up so that the exposure time coincides with a duration corresponding to a minimum value of integral multiples of the vertical scanning period of the CRT 40, the theoretical exposure time may be rounded off by adjusting the spectral sensitivity of the R, G, and B filters and the spectral sensitivity of color paper.

In addition, although, in the above, the exposure amount corresponding to difference $\Delta t_N$ between exposure time $T_N$ for actually applying the light pattern to color paper 38 and time $t_N$ as a theoretical value is compensated for by correcting image data stored in the VRAM 50F, the present invention is not limited to the same. For example, the amount of exposure of color paper 38 to the light pattern may be corrected by correcting the amount of reading light to be applied to the spatial light modulating element 32 in correspondence to difference $\Delta t_N$.

Further, although, in this embodiment, the adjustment of trimming and enlargement magnification is effected by the controller 50 and magnification is fixed without moving the exposing projection lens 34, if the exposing projecting lens 34 is made movable, and is moved to a position corresponding to a desired enlargement magnification, it is possible to obviate a decline in the resolution which occurs due to the enlargement of the magnification of the image to be written to the image writing CRT 40, even in cases where a large magnification is desired.

Second Embodiment

Next, referring to FIGS. 12 to 14, a description will be given of a second embodiment of the present invention. In the second embodiment, the emergent light is photometrically measured by an image area sensor, and a comparison is made with a desired image, so as to correct the partial unevenness of the amount of modulation of the spatial light modulating element. Incidentally, since the configuration of a photographic printer 10a in accordance with the second embodiment is substantially similar to that of the photographic printer 10 described in the first embodiment, identical portions will be denoted by the same reference numerals, and a detailed description thereof will be omitted. Hereafter, only different portions will be described.

Figure 12:
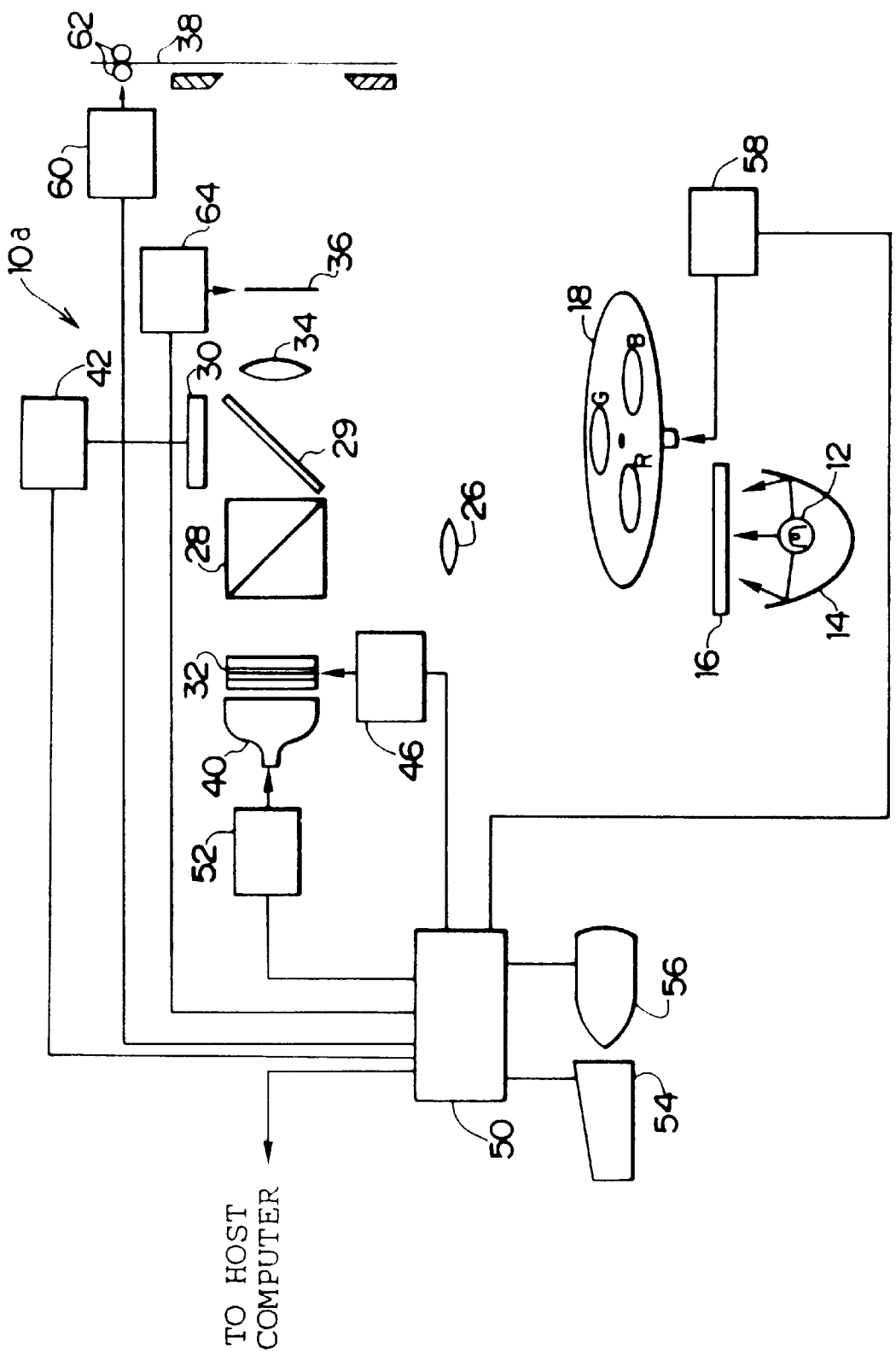
FIG. 12 is a schematic diagram illustrating the configuration of a photographic printer in accordance with a second embodiment of the present invention.

As shown in FIG. 12, in the photographic printer 10a in accordance with the second embodiment, a flat plate-shaped beam splitter 29 is disposed between the polarizing beam splitter 28 and the exposing projection lens 34 in such a manner as to be inclined 45° with respect to the optical path of the light emergent from the polarizing beam splitter 28 toward the exposing projection lens 34. This beam splitter 29 causes part of the light emergent from the polarizing beam splitter 28 toward the exposing projection lens 34 to branch 90° with respect to the optical path. An image area sensor 30 for photometrically measuring branched light is disposed above the optical path of the light branched by the beam splitter 29. The image area sensor 30 is connected to a sensor controlling unit 42 for controlling the image area sensor 30. The sensor controlling unit 42 is connected to the I/O interface 50E of the controller 50 (see FIG. 2).

Next, image exposure processing which is executed by the photographic printer 10a will be described as processing in accordance with the second embodiment. Incidentally, a description will be given hereafter of only portions which differ from those of the image exposure processing described in the first embodiment.

Figure 13:
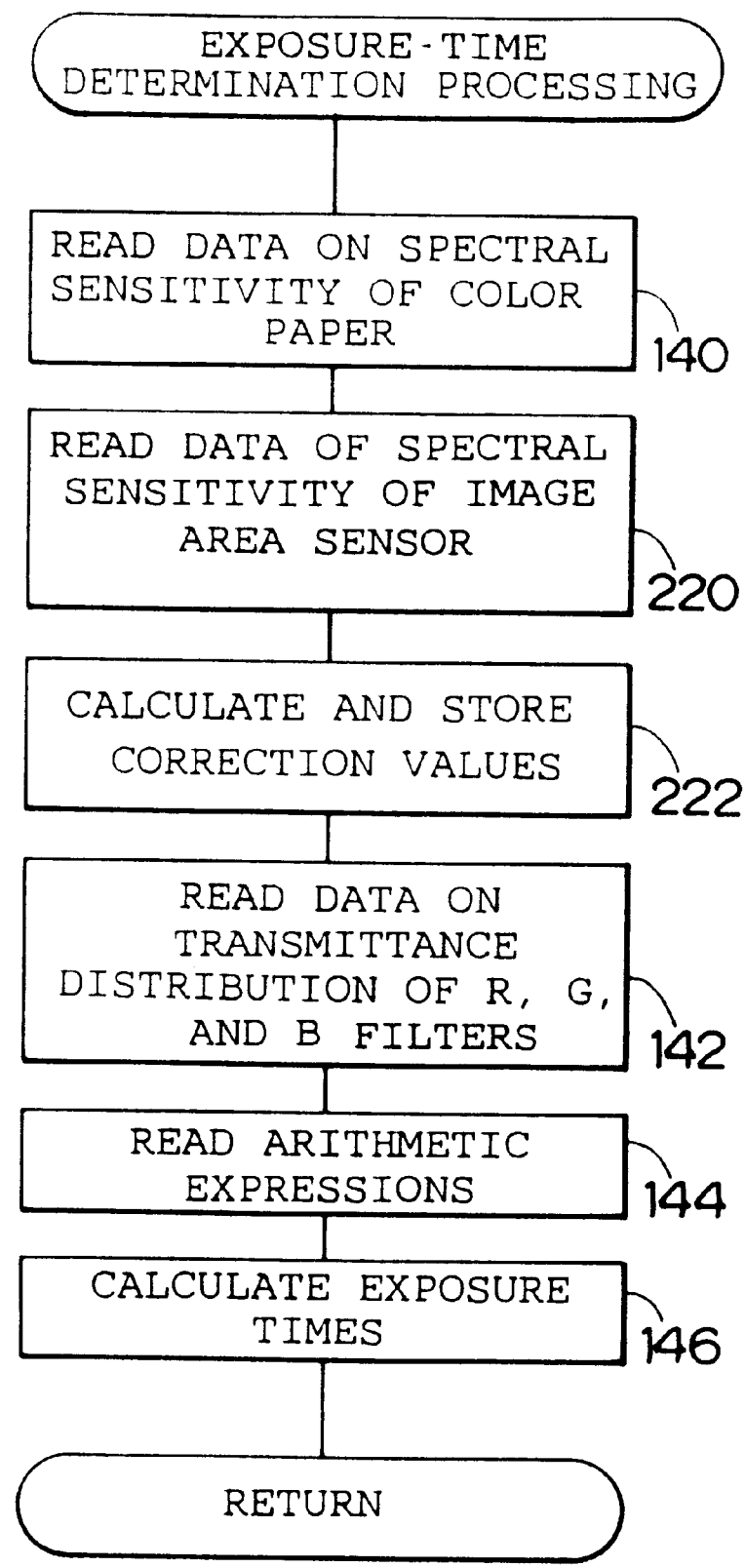
FIG. 13 is a flowchart illustrating exposure-time determination processing in accordance with the second embodiment.

As shown in FIG. 13, in the second embodiment, when reading of data on the spectral sensitivity of color paper 38 is finished in Step 140 concerning exposure-time determination processing, in Step 220, data on the spectral sensitivity of the image area sensor 30 is read from the ROM 50C. Next, in Step 222, correction values for correcting photometric values which are output from the image area sensor 30 are calculated for the respective colors, R, G, and B, and calculated correction values are stored in the RAM 50D, so that photometric values equivalent to those in which the spectral sensitivity of the image area sensor 30 and the spectral sensitivity of color paper 38 match can be obtained as a result of photometric measurement by the image area sensor 30 on the basis of data on the spectral sensitivity of color paper 38 and data on the spectral sensitivity of the image area sensor 30.

Incidentally, the aforementioned correction values may be stored in advance in the ROM 50C or the like. Processing in ensuing Step 142 and thereafter is similar to that of the first embodiment.

Figure 14:
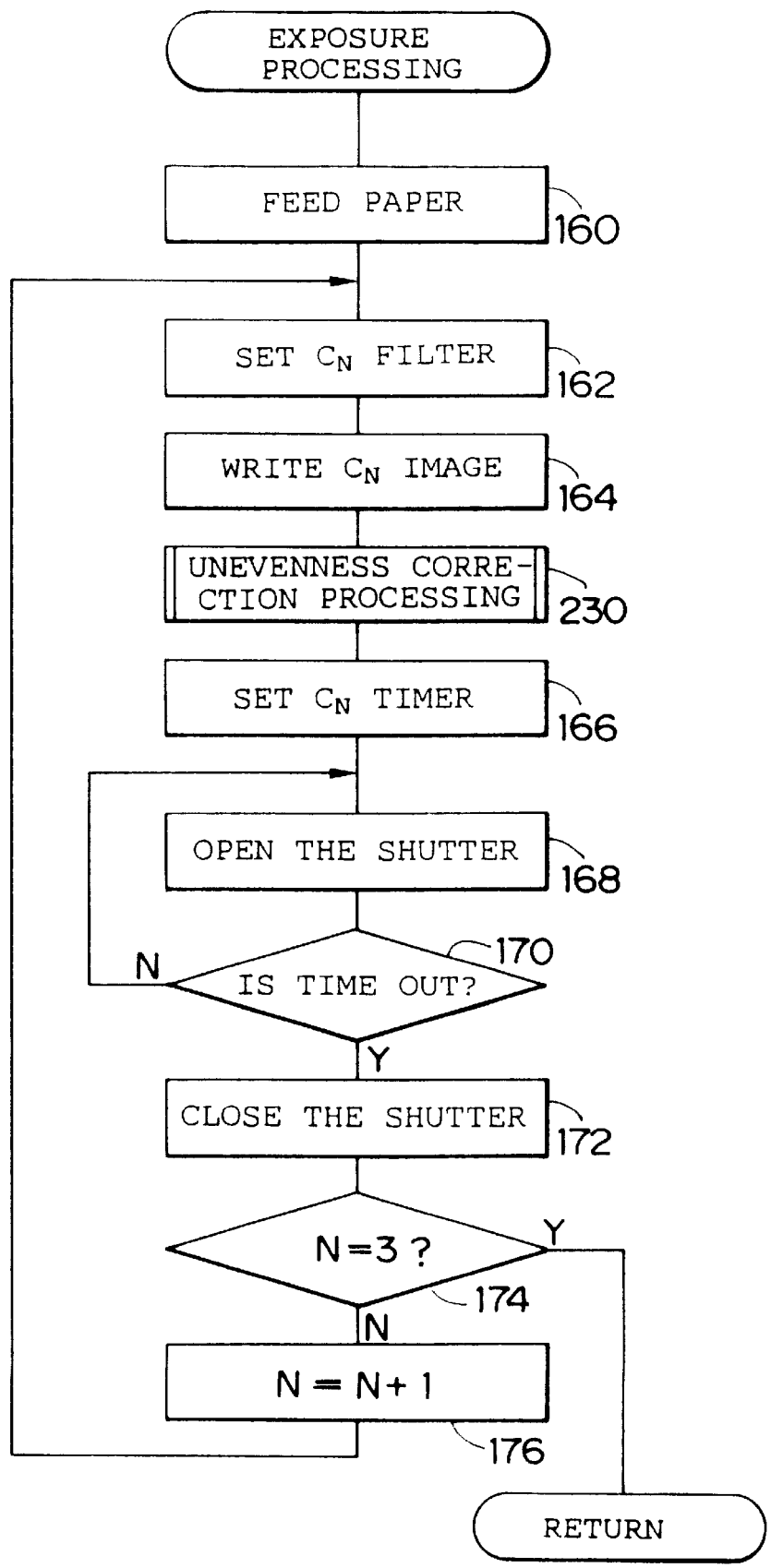
FIG. 14 is a flowchart illustrating exposure processing in accordance with the second embodiment.
Figure 15:
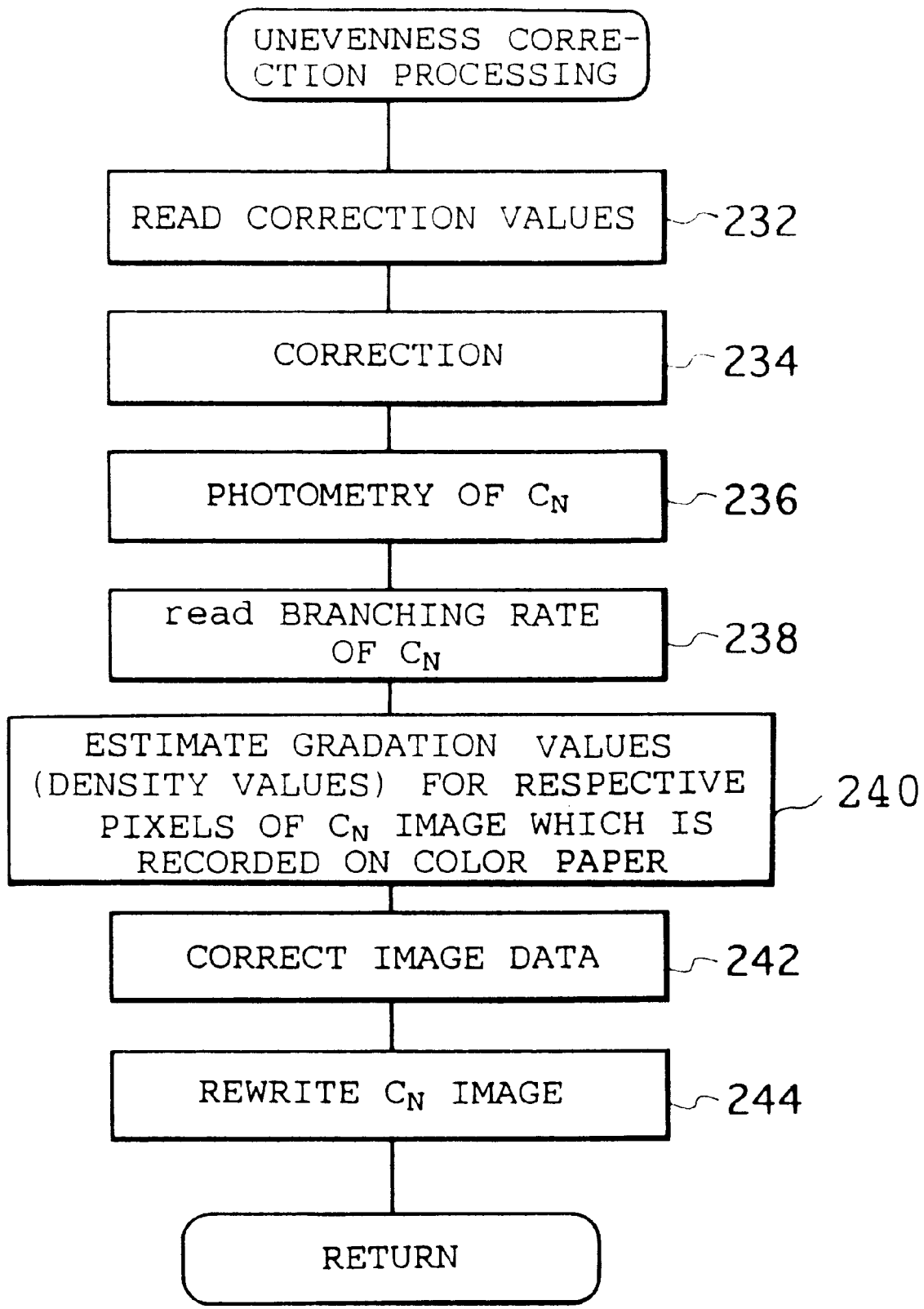
FIG. 15 is a flowchart illustrating unevenness correction processing in accordance with the second embodiment.
Figure 16:
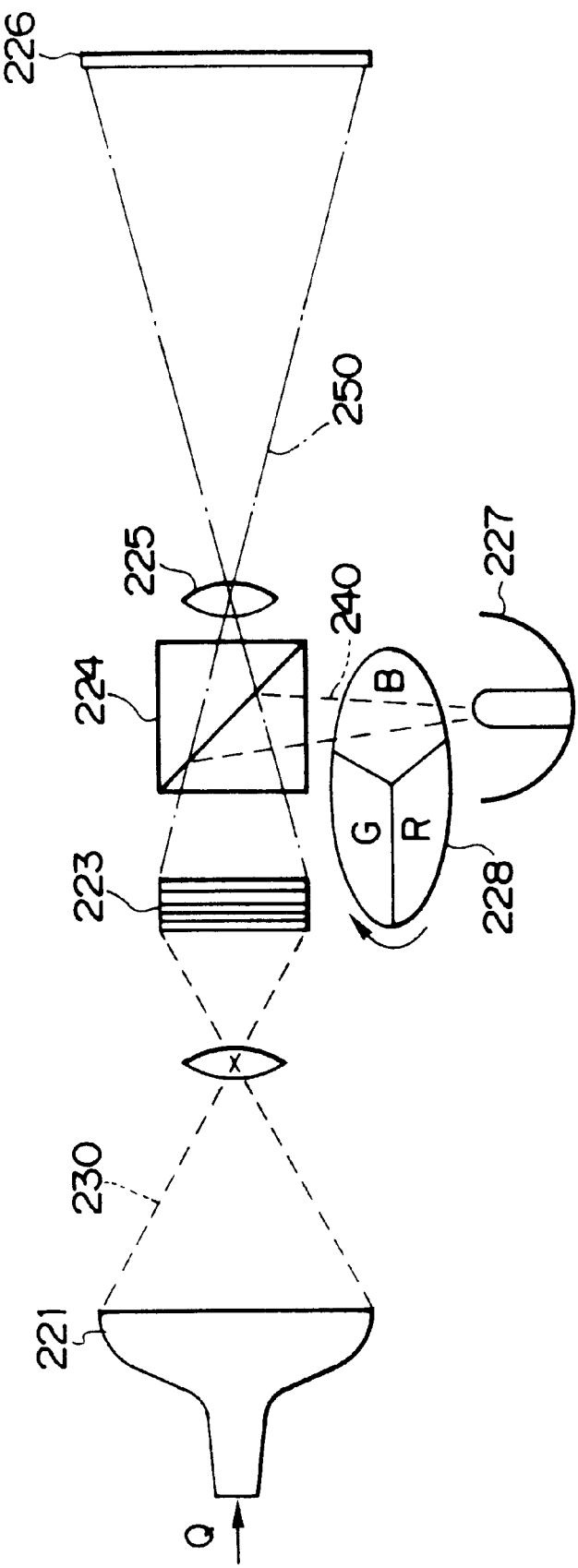
FIG. 16 is a schematic diagram illustrating the configuration of a conventional image recording apparatus using a spatial light modulating element.

In addition, in exposure processing in accordance with the second embodiment, as shown in FIG. 14, the $C_N$ filter is set in Step 162, and light transmitted through the $C_N$ filter is applied to the spatial light modulating element 32 as the reading light. After the $C_N$ image is written to the spatial light modulating element 32 in ensuing Step 164, the unevenness correction processing shown in Step 230 in FIG. 15 is executed.

First, in Step 232, correction values stored in the RAM 50D in Step 222 are read. Then, in Step 234, correction values concerning $C_N$, i.e., R, are sent to the sensor control unit 42. Consequently, when photometric values are output from the image area sensor 30, correction is effected by the sensor control unit 42 so that photometric values become equivalent to those in which the spectral sensitivity of the image area sensor 30 with respect to $C_N$ and the spectral sensitivity of color paper 38 with respect to $C_N$ match. Corrected photometric values are output from the sensor control unit 42.

Next, in Step 236, the sensor control unit 42 is controlled, and if light having an intensity distribution corresponding to the $C_N$ image emergent from the spatial light modulating element 32 toward the exposing projection lens 34 via the polarizing beam splitter 28, light branched by the beam splitter 29 is photometrically measured by the image area sensor 30, and photometric values for the respective pixels are stored in the VRAM 50F. Incidentally, the start and end of the photometrical measuring time are made to synchronize with vertical scanning of the image writing CRT 40, and photometrical measured time is made to coincide with a duration corresponding to a minimum value of integral multiples of the vertical scanning period.

In Step 238, the branching rate of $C_N$ stored in advance in the ROM 50C is read (the branching rate of $C_N$ is the ratio of light which is branched by the beam splitter 29 and reaches the image area sensor 30, if the light having an exposure light intensity distribution of the $C_N$ image emergent via the polarizing beam splitter 28). In ensuing Step 240, gradation values (density values) for the respective pixels of the $C_N$ image which is recorded on color paper 38 are estimated.

That is, the light intensity for each pixel (corresponding to the illuminance $I_N$ in Formulas (2) to (4)) of the exposure light of the $C_N$ image which is transmitted through the beam splitter 29 and reaches color paper 38 is first calculated for each pixel on the basis of the branching rate which has been read in Step 238 as well as the photometric values for the respective pixels. This illuminance (light intensity) can be calculated from the formula:

Light intensity (illuminance) for each pixel (photometric value÷branching rate)−photometric value Next, the light intensity for each pixel determined above is substituted into one of Formulas (2) to (4) as illuminance $I_N$, and exposure time $T_N$ determined in exposure-time determination processing is substituted into the same, whereby exposure amount $\log E_N$ for each pixel is determined. Further, gradation values (density values or luminance values) of the $C_N$ image which is estimated to be recorded on color paper 38 are calculated for the respective pixels on the basis of exposure amount $\log E_N$ for each pixel determined above as well as the color development characteristics (see FIG. 9) concerning $C_N$ of color paper 38.

In ensuing Step 242, image-data correction processing is effected in which a comparison is made for each corresponding pixel between, on the one hand, the estimated gradation value for each pixel of the $C_N$ image determined in Step 240 and, on the other hand, the gradation value for each pixel of the $C_N$ image represented by image data ($C_N$ image data) stored in the VRAM 50F, and $C_N$ image data is corrected in accordance with the result of comparison. Here, if partial unevenness of modulation has not occurred in the spatial light modulating element 32, the estimated value of the gradation value and the gradation value represented by the $C_N$ image data agree with each other with respect to all pixels. However, in a case where partial unevenness of modulation has occurred in the spatial light modulating element 32, deviations occur in the gradation values of particular pixels.

For this reason, in Step 242, if the deviation of the gradation value is within a fixed range (e.g., within 2%), $C_N$ image data is not corrected, whereas if it exceeds the fixed range, $C_N$ image data is corrected. The correction of $C_N$ image data can be effected by increasing or decreasing the gradation value of the $C_N$ image data for the corresponding pixel by the difference between, for example, the estimated value of the gradation value and the gradation value represented by the $C_N$ image data. In Step 242, corrected $C_N$ image data is stored in the VRAM 50F.

In ensuing Step 244, corrected $C_N$ image data stored in the VRAM 50F in Step 242 is read and sent to the writing CRT control unit 52. As a result, the $C_N$ image which has been corrected in correspondence to the partial unevenness of modulation of the spatial light modulating element 32 is written to the image writing CRT 40. Thus, the $C_N$ image which has been corrected in correspondence with the partial unevenness of modulation of the spatial light modulating element 32 is written to the spatial light modulating element 32 as well by means of writing light emergent from the image writing CRT 40.

As described above, in the second embodiment, the emergent light which is branched by the beam splitter 29 is photometrically measured by the image area sensor 30, image data is corrected in correspondence with the partial unevenness of the modulation amount of the spatial light modulating element 32 by making a comparison with image data, and the exposure of color paper 38 is effected by using corrected image data. Accordingly, it is possible to prevent the occurrence of density unevenness in the reproduced image formed on color paper 38, which occurs due to the use of the spatial light modulating element 32.

In addition, although the spatial light modulating element is liable to undergo a change in light modulation characteristics due to a change in temperature, since partial unevenness of the modulation amount of the spatial light modulating element can thus be corrected in accordance with the second embodiment as described above, it is possible to prevent the occurrence of density unevenness in the reproduced image which is formed on color paper 38 due to the temperature change.

Although, in the above, at the time of formation of a reproduced image on color paper, the image is temporarily written in the spatial light modulating element 32 by the image writing CRT, reading light is photometrically measured by the image area sensor 30, and correction is effected in correspondence with the partial unevenness of the modulation amount of the spatial light modulating element on the basis of the results of photometry, the present invention is not limited to the same. Namely, an arrangement may be provided such that a plurality of reference images in which gradation values of all pixels are fixed and are mutually different is written in advance by means of the image writing CRT, and a table representing the relationship between gradation values of reference images for the respective pixels and the exposure intensity is prepared in advance on the basis of the results of photometry which is consecutively conducted with respect to reading light by the image area sensor. Incidentally, at the time of photometry by the image area sensor in the above-described case, to prevent saturation of output of the image area sensor, it is preferable to insert a light reducing means into a location on the optical path leading from the lamp 12 to the image area sensor. In addition, when a reproduced image is formed on color paper, it suffices if the gradation values for the respective pixels of the image which is formed on the color paper are estimated by using the aforementioned table, and image data is corrected in correspondence to the difference between the estimated gradation values and image data. According to the above-described arrangement, it is possible to effect correction corresponding to partial unevenness of the modulation amount of the spatial light modulating element without temporarily writing the image to the spatial light modulating element 32 for the purpose of making the correction.

Although, in the above, a noninterlaced CRT is used as the image writing CRT, it is also possible to use an interlaced CRT.

Although, in the above, an image is written to the spatial light modulating element by means of the image writing CRT, the image may be written to the spatial light modulating element by scanning of not only the CRT but also a LED or a laser diode (LD).

Further, if an arrangement is provided such that three spatial light modulating elements are provided, the R, G, and B images are written to the respective spatial light modulating elements, and images are recorded or read simultaneously by means of the respective emergent light, the recording or reading of images can be effected in a short period of time.

Although, in the above, the exposure of color paper is started within the blanking period of the vertical scanning of the image writing CRT and the exposure of color paper is finished within the blanking period, the present invention is not limited to the same. Namely, an arrangement may be provided such that the exposure of color paper is started not within the blanking period of vertical scanning and the exposure of color paper is not finished within the blanking period, insofar as the exposure time accurately coincides with an integral multiple of the vertical scanning period.

What is claimed is:

1. A light-pattern illuminating apparatus for use in an image recording apparatus in which a light pattern corresponding to image information is applied to an image receiving element and an image represented by image information is recorded on the image receiving element, or in an image reading apparatus in which an image represented by image information is read by the image receiving element, comprising:

light-pattern holding means in which, as the light pattern is applied to one surface thereof, the light pattern is written, and from which, as reading light is applied to another surface thereof, the written light pattern is read;

light-pattern writing means for applying the light pattern corresponding to image information to said one surface of said light-pattern holding means in a state in which at least vertical scanning is controlled;

light-pattern reading and illuminating means for illuminating said another surface of said light-pattern holding means with reading light and for illuminating the image receiving element with the light pattern which has been read from said light-pattern holding means; and controlling means for controlling a duration of illumination of the image receiving element with the light pattern such that the duration becomes approximately an integral multiple of a period of the vertical scanning.

2. A light-pattern illuminating apparatus according to claim 1, wherein said controlling means provides control so that a start of application of the light pattern to the image receiving element is synchronized with a start of vertical scanning, and an end of application of the light pattern thereto is synchronized with an end of an integral number of times of vertical scanning.

3. A light-pattern illuminating apparatus according to claim 1, wherein said controlling means determines a theoretical value of the duration of illumination of the image receiving element with the light pattern on the basis of image information, and sets a set value of the duration of illumination of the image receiving element with the light pattern such that the set value becomes a value which is equal to or greater than the determined theoretical value and agrees with or is approximate to a minimum value of integral multiples of the period of vertical scanning, and wherein said light-pattern writing means corrects image information on the basis of a difference between the theoretical value and set value of the duration of illumination of the image receiving element with the light pattern, and applies the light pattern corresponding to corrected image information to the one surface of said light-pattern holding means, or said light-pattern reading and illuminating means corrects an amount of application of reading light to said another surface of said light-pattern holding means on the basis of the difference between the theoretical value and the set value of the duration of illumination of the image receiving element with the light pattern.

4. A light-pattern illuminating apparatus according to claim 2, wherein said controlling means determines a theoretical value of the duration of illumination of the image receiving element with the light pattern on the basis of image information, and sets a set value of the duration of illumination of the image receiving element with the light pattern such that the set value becomes a value which is equal to or greater than the determined theoretical value and agrees with or is approximate to a minimum value of integral multiples of the period of vertical scanning, and wherein said light-pattern writing means corrects image information on the basis of a difference between the theoretical value and set value of the duration of illumination of the image receiving element with the light pattern, and applies the light pattern corresponding to corrected image information to the one surface of said light-pattern holding means, or said light-pattern reading and illuminating means corrects an amount of application of reading light to said another surface of said light-pattern holding means on the basis of the difference between the theoretical value and the set value of the duration of illumination of the image receiving element with the light pattern.

5. A light-pattern illuminating apparatus according to claim 1, further comprising:

photometrical measuring means for photometrically measuring the light pattern which has been read from said light-pattern holding means as a two-dimensional distribution of light intensity; and correcting means for correcting image information on the basis of a difference between the two-dimensional distribution of light intensity photometrically measured by said photometrical measuring means and image information;

wherein said light-pattern writing means applies the light pattern corresponding to image information corrected by said correcting means to said one surface of said light-pattern holding means.

6. A light-pattern illuminating apparatus according to claim 2, further comprising:

photometrical measuring means for photometrically measuring the light pattern which has been read from said light-pattern holding means as a two-dimensional distribution of light intensity; and correcting means for correcting image information on the basis of a difference between the two-dimensional distribution of light intensity photometrically measured by said photometrical measuring means and image information;

wherein said light-pattern writing means applies the light pattern corresponding to image information corrected by said correcting means to said one surface of said light-pattern holding means.

7. A light-pattern illuminating apparatus according to claim 3, further comprising:

photometrical measuring means for photometrically measuring the light pattern which has been read from said light-pattern holding means as a two-dimensional distribution of light intensity; and correcting means for correcting image information on the basis of a difference between the two-dimensional distribution of light intensity photometrically measured by said photometrical measuring means and image information;

wherein said light-pattern writing means applies the light pattern corresponding to image information corrected by said correcting means to said one surface of said light-pattern holding means.

8. A light-pattern illuminating apparatus according to claim 4, wherein said correcting means corrects a gradation of image information for each pixel.

9. A light-pattern illuminating apparatus according to claim 5, further comprising:

branching means for branching the light pattern which has been read from said light-pattern holding means;

wherein said photometrical measuring means photometrically measures the light pattern branched by said branching means.

10. A light-pattern illuminating apparatus according to claim 8, further comprising:

branching means for branching the light pattern which has been read from said light-pattern holding means, wherein said photometrical measuring means photometrically measures the light pattern branched by said branching means.

11. A light-pattern illuminating method for use in an image recording apparatus in which a light pattern corresponding to image information is applied to an image receiving element and an image represented by image information is recorded on the image receiving element, or in an image reading apparatus in which an image represented by image information is read by the image receiving element, comprising the steps of:

writing the light pattern to light-pattern holding means by applying the light pattern corresponding to image information to one surface of said light-pattern holding means while at least vertical scanning is being controlled;

reading the light pattern written to said light-pattern holding means by applying reading light to another surface of said light-pattern holding means; and illuminating the image receiving element with the light pattern which has been read from said light-pattern holding means, for a duration which is approximately an integral multiple of a period of vertical scanning.

12. A light-pattern illuminating method according to claim 11, wherein the illumination of the image receiving element with the light pattern which has been read from said light-pattern holding means is started in synchronization with a start of vertical scanning, and is finished in synchronization with an end of an integral number of times of vertical scanning.

13. A light-pattern illuminating method according to claim 11, wherein the light pattern which has been read from said light-pattern holding means is photometrically measured as a two-dimensional distribution of light intensity, image information is corrected on the basis of a difference between the photometrically measured two-dimensional distribution of light intensity and image information, and the light pattern corresponding to the corrected image information is applied to said one surface of said light-pattern holding means.

14. A light-pattern illuminating method according to claim 12, wherein the light pattern which has been read from said light-pattern holding means is photometrically measured as a two-dimensional distribution of light intensity, image information is corrected on the basis of a difference between the photometrically measured two-dimensional distribution of light intensity and image information, and the light pattern corresponding to the corrected image information is applied to said one surface of said light-pattern holding means.

\* \* \* \* \*